(12) United States Patent
Schwarz et al.

(10) Patent No.: US 11,598,223 B2
(45) Date of Patent: Mar. 7, 2023

(54) GAS TURBINE ENGINE WITH HIGH SPEED LOW PRESSURE TURBINE SECTION AND BEARING SUPPORT FEATURES

(71) Applicant: United Technologies Corporation, Farmington, CT (US)

(72) Inventors: Frederick M. Schwarz, Glastonbury, CT (US); Gabriel L. Suciu, Glastonbury, CT (US); William K. Ackermann, East Hartford, CT (US); Daniel Bernard Kupratis, Wallingford, CT (US); Michael E. McCune, Colchester, CT (US)

(73) Assignee: RAYTHEON TECHNOLOGIES CORPORATION, Farmington, CT (US)

(*) Notice: Subject to any disclaimer, the term of this patent is extended or adjusted under 35 U.S.C. 154(b) by 41 days.

(21) Appl. No.: 16/227,271

(22) Filed: Dec. 20, 2018

(65) Prior Publication Data
US 2019/0120084 A1 Apr. 25, 2019

Related U.S. Application Data

(63) Continuation of application No. 15/478,706, filed on Apr. 4, 2017, now Pat. No. 10,287,914, which is a (Continued)

(51) Int. Cl.
*F01D 25/16* (2006.01)
*F02K 3/06* (2006.01)
(Continued)

(52) U.S. Cl.
CPC .......... *F01D 25/164* (2013.01); *F01D 15/12* (2013.01); *F01D 25/162* (2013.01); *F02C 3/107* (2013.01);
(Continued)

(58) Field of Classification Search
CPC .......... F01D 25/164; F01D 15/12; F02C 7/36; F02C 3/107; F05D 2260/40311
See application file for complete search history.

(56) References Cited

U.S. PATENT DOCUMENTS 2,258,792 A 4/1941 New
2,620,157 A * 12/1952 Morley ............... F01D 25/162
384/321
(Continued)

FOREIGN PATENT DOCUMENTS

EP 0791383 8/1997
EP 1142850 10/2001
(Continued)

OTHER PUBLICATIONS

Sabnis, Winkler, "The PW1000G Pure Power New Engine Concept and its impacton MRO" Dec. 1, 2010. (Year: 2010).*
(Continued)

*Primary Examiner* — Steven M Sutherland
(74) *Attorney, Agent, or Firm* — Carlson, Gaskey & Olds, P.C.

(57) ABSTRACT

A turbofan engine according to an example of the present disclosure includes, among other things, a fan, and an outer housing surrounding the fan to define a bypass flow path, a compressor, a turbine section including a fan drive turbine and a second turbine, an epicyclic gear system with a gear reduction, the fan drive turbine driving the fan through the gear system, and the gear system straddle-mounted by first and second bearings. The fan drive turbine has a first exit area at a first exit point and is rotatable at a first speed. The second turbine has a second exit area at a second exit point and is rotatable at a second speed. A first performance quantity is defined as the product of the first speed squared and the first area. A second performance quantity is defined
(Continued)

as the product of the second speed squared and the second area.

20 Claims, 4 Drawing Sheets

Related U.S. Application Data continuation-in-part of application No. 13/446,510, filed on Apr. 13, 2012, now Pat. No. 9,611,859, which is a continuation-in-part of application No. 13/363,154, filed on Jan. 31, 2012, now abandoned.

(60) Provisional application No. 61/619,124, filed on Apr. 2, 2012.

(51) Int. Cl.
  *F02C 3/107* (2006.01)
  *F01D 15/12* (2006.01)
  *F02C 7/06* (2006.01)
  *F02C 7/20* (2006.01)
  *F02C 7/36* (2006.01)

(52) U.S. Cl.
  CPC ............... *F02C 7/06* (2013.01); *F02C 7/20* (2013.01); *F02C 7/36* (2013.01); *F02K 3/06* (2013.01); *F05D 2220/32* (2013.01); *F05D 2240/60* (2013.01); *F05D 2260/40311* (2013.01)

(56) References Cited

U.S. PATENT DOCUMENTS

| | | | |
|---|---|---|---|
| 2,936,655 A | 5/1960 | Peterson et al. | |
| 3,021,731 A | 2/1962 | Stoeckicht | |
| 3,194,487 A | 7/1965 | Tyler et al. | |
| 3,250,512 A | 5/1966 | Petrie | |
| 3,287,906 A | 11/1966 | McCormick | |
| 3,352,178 A | 11/1967 | Lindgren et al. | |
| 3,412,560 A | 11/1968 | Gaubatz | |
| 3,526,092 A | 9/1970 | Steel | |
| 3,527,054 A | 9/1970 | Hemsworth | |
| 3,664,612 A | 5/1972 | Skidmore et al. | |
| 3,722,215 A * | 3/1973 | Zhdanov ............... | F02C 3/145 60/800 |
| 3,747,343 A | 7/1973 | Rosen | |
| 3,754,484 A | 8/1973 | Roberts | |
| 3,820,719 A | 6/1974 | Clark | |
| 3,861,139 A | 1/1975 | Jones | |
| 3,892,358 A | 7/1975 | Gisslen | |
| 3,932,058 A | 1/1976 | Harner et al. | |
| 3,935,558 A | 1/1976 | Miller et al. | |
| 3,988,889 A | 11/1976 | Chamay et al. | |
| 4,130,872 A | 12/1978 | Harloff | |
| 4,284,174 A | 8/1981 | Salvana et al. | |
| 4,289,360 A | 9/1981 | Zirin | |
| 4,304,522 A | 12/1981 | Newland | |
| 4,478,551 A | 10/1984 | Honeycutt, Jr. et al. | |
| 4,649,114 A | 3/1987 | Miltenburger et al. | |
| 4,693,616 A | 9/1987 | Rohra et al. | |
| 4,696,156 A | 9/1987 | Burr et al. | |
| 4,827,712 A | 5/1989 | Coplin | |
| 4,885,912 A * | 12/1989 | Nakhamkin ............... | F02C 3/36 60/652 |
| 4,916,894 A | 4/1990 | Adamson | |
| 4,969,325 A * | 11/1990 | Adamson ............... | F02C 3/067 60/226.1 |
| 4,979,362 A | 12/1990 | Vershure, Jr. | |
| 5,102,379 A | 4/1992 | Pagluica et al. | |
| 5,141,400 A | 8/1992 | Murphy et al. | |
| 5,317,877 A | 6/1994 | Stuart | |
| 5,361,580 A | 11/1994 | Ciokajlo et al. | |
| 5,433,674 A | 7/1995 | Sheridan et al. | |
| 5,447,411 A | 9/1995 | Curley et al. | |
| 5,466,198 A | 11/1995 | McKibbin et al. | |
| 5,524,847 A | 6/1996 | Brodell et al. | |
| 5,634,767 A | 6/1997 | Dawson | |
| 5,677,060 A | 10/1997 | Terentieva et al. | |
| 5,778,659 A | 7/1998 | Duesler et al. | |
| 5,857,836 A | 1/1999 | Stickler et al. | |
| 5,915,917 A | 6/1999 | Eveker et al. | |
| 5,975,841 A | 11/1999 | Lindemuth et al. | |
| 5,985,470 A | 11/1999 | Spitsberg et al. | |
| 6,223,616 B1 | 5/2001 | Sheridan | |
| 6,315,815 B1 | 11/2001 | Spadaccini et al. | |
| 6,318,070 B1 | 11/2001 | Rey et al. | |
| 6,387,456 B1 | 5/2002 | Eaton, Jr. et al. | |
| 6,517,341 B1 | 2/2003 | Brun et al. | |
| 6,607,165 B1 | 8/2003 | Manteiga et al. | |
| 6,709,492 B1 | 3/2004 | Spadaccini et al. | |
| 6,814,541 B2 | 11/2004 | Evans et al. | |
| 6,883,303 B1 | 4/2005 | Seda | |
| 7,021,042 B2 | 4/2006 | Law | |
| 7,219,490 B2 | 1/2007 | Dev | |
| 7,328,580 B2 | 2/2008 | Lee et al. | |
| 7,374,403 B2 | 5/2008 | Decker et al. | |
| 7,591,754 B2 | 9/2009 | Duong et al. | |
| 7,632,064 B2 | 12/2009 | Somanath | |
| 7,662,059 B2 | 2/2010 | McCune | |
| 7,806,651 B2 | 10/2010 | Kennepohl et al. | |
| 7,824,305 B2 | 11/2010 | Duong et al. | |
| 7,828,682 B2 | 11/2010 | Smook | |
| 7,926,260 B2 | 4/2011 | Sheridan et al. | |
| 7,997,868 B1 | 8/2011 | Liang et al. | |
| 8,205,432 B2 | 6/2012 | Sheridan | |
| 8,899,915 B2 | 12/2014 | McCune et al. | |
| 2003/0163984 A1 | 9/2003 | Seda et al. | |
| 2006/0228206 A1 | 10/2006 | Decker et al. | |
| 2007/0084183 A1 | 4/2007 | Moniz et al. | |
| 2007/0265133 A1 | 11/2007 | Smook | |
| 2008/0003096 A1 | 1/2008 | Kohli et al. | |
| 2008/0098714 A1 | 5/2008 | Orlando et al. | |
| 2008/0098718 A1 | 5/2008 | Henry et al. | |
| 2008/0116009 A1 | 5/2008 | Sheridan et al. | |
| 2008/0148707 A1 | 6/2008 | Schilling | |
| 2008/0317588 A1 | 12/2008 | Grabowski et al. | |
| 2009/0056343 A1 | 3/2009 | Suciu et al. | |
| 2009/0092494 A1 | 4/2009 | Cairo et al. | |
| 2009/0314881 A1 | 12/2009 | Suciu et al. | |
| 2010/0105516 A1 | 4/2010 | Sheridan et al. | |
| 2010/0132376 A1 | 6/2010 | Durocher et al. | |
| 2010/0148396 A1 | 6/2010 | Xie et al. | |
| 2010/0212281 A1 | 8/2010 | Sheridan | |
| 2010/0218478 A1 | 9/2010 | Merry et al. | |
| 2010/0218483 A1 | 9/2010 | Smith | |
| 2010/0331139 A1 | 12/2010 | McCune | |
| 2011/0159797 A1 | 6/2011 | Beltman et al. | |
| 2011/0293423 A1 | 12/2011 | Bunker et al. | |
| 2012/0017603 A1 | 1/2012 | Bart et al. | |
| 2012/0124964 A1 | 5/2012 | Hasel et al. | |
| 2012/0291449 A1 | 11/2012 | Adams | |
| 2013/0192201 A1 | 8/2013 | Kupratis et al. | |
| 2013/0195648 A1 | 8/2013 | Schwarz et al. | |
| 2013/0287575 A1 | 10/2013 | McCune et al. | |
| 2016/0032826 A1 | 2/2016 | Rued | |

FOREIGN PATENT DOCUMENTS

| | | |
|---|---|---|
| EP | 2071139 | 6/2009 |
| EP | 2071139 A2 | 6/2009 |
| EP | 2532841 | 12/2012 |
| EP | 2532858 | 12/2012 |
| EP | 2809575 | 12/2014 |
| EP | 2809934 | 12/2014 |
| EP | 2809939 | 12/2014 |
| EP | 2809953 | 12/2014 |
| EP | 2811120 | 12/2014 |
| EP | 2841718 | 3/2015 |
| EP | 2809931 | 7/2016 |
| FR | 2563865 | 11/1985 |
| FR | 2912181 | 8/2008 |
| GB | 745239 | 2/1956 |

(56) References Cited

FOREIGN PATENT DOCUMENTS

| | | |
|---|---|---|
| GB | 1516041 | 6/1978 |
| GB | 2041090 | 9/1980 |
| GB | 2426792 | 12/2006 |
| WO | 2007038674 | 4/2007 |
| WO | 2013116262 | 8/2013 |
| WO | 2014047040 | 3/2014 |

OTHER PUBLICATIONS

Aviation Investigation Report A14Q0068, Transportation Safety Board of Canada, May 2014. (Year: 2014).*
Type Certificate Data Sheet for PW1500G Series Engines, EASA, 2021. (Year: 2021).*
Whitaker, R. (1982). ALF 502: plugging the turbofan gap. Flight International, p. 237-241, Jan. 30, 1982.
Munt, R. (1981). Aircraft technology assessment: Progress in low emissions engine. Technical Report. May 1981. pp. 1-171.
Waters, M.H. and Schairer, E.T. (1977). Analysis of turbofan propulsion system weight and dimensions. NASA Technical Memorandum. Jan. 1977. pp. 1-65.
Avco Lycoming Divison. ALF 502L Maintenance Manual. Apr. 1981. pp. 1-118.
Type Certificate Data Sheet No. E6NE. Department of Transportation Federal Aviation Administration. Jun. 7, 2002. pp. 1-10.
Trembley, Jr., H.F. (1977). Determination of effects of ambient conditions on aircraft engine emissions. Prepared for Environmental Protection Agency. Ann Arbor, Michigan. Sep. 1977 pp. 1-256.
Honeywell LF502. Jane's Aero-engines, Aero-engines—Turbofan. Feb. 9, 2012.
Honeywell LF502. Jane's Aero-engines, Aero-engines—Turbofan. Aug. 17, 2016.
Dickey, T.A. and Dobak, E.R. (1972). The evolution and development status of ALF 502 turbofan engine. National Aerospace Engineering and Manufacturing Meeting. San Diego, California. Oct. 2-5, 1972. pp. 1-12.
Cusick, M. (1981). Avco Lycoming's ALF 502 high bypass fan engine. Society of Automotive Engineers, inc. Business Aircraft Meeting & Exposition. Wichita, Kansas. Apr. 7-10, 1981. pp. 1-9.
Rauch, D. (1972). Design study of an air pump and integral lift engine ALF-504 using the Lycoming 502 core. Prepare for NASA. Jul. 1972. pp. 1-182.
Dassault Falcon 900EX Easy Systems Summary. Retrieved from: http://www.smartcockpit.com/docs/F900EX-Engines.pdf pp. 1-31.
Honeywell TFE731 Pilot Tips. pp. 1-143.
Honeywell TFE731-5AR to -5BR Engine Conversion Program. Sep. 2005. pp. 1-4.
Garret TFE731 Turbofan Engine (CAT C). Chapter 79: Lubrciation System. TTFE731 Issue 2. 2010. pp. 1-24.
McArdle, J.G. (1979). Static test-stand performance of the YF-102 turbofan engine with several exhaust configurations for the quiet short-haul research aircraft (QSRA). Nasa Technical Paper. Nov. 1979. pp. 1-68.
Request for Opinion as to Validity for European Patent No. 2809922 (13778330.4) by Rolls Royce dated Feb. 6, 2019.
Annotation of Edkins, D.P., Hirschkron, R., and Lee, R. (1972). TF34 turbofan quiet engine study. Final Report prepared for NASA. NASA-CR-120914. Jan. 1, 1972. p. 92.
Annotation of Gray, D.E. (1978). Energy efficient engine preliminary design and integration studies. Prepared for NASA. NASA CR-135396. Nov. 1978. p. 70.
Decision Institution of Inter Partes Review. *General Electric Company.*, Petitioner, v. *United Technologies Corp.*, Patent Owner. IPR2018-01442. U.S. Pat. No. 9,695,751. Entered Feb. 21, 2019. pp. 1-25.
Third Party Observations for European Patent No. 2841718 (13822569. 3) dated Jan. 2, 2019.
Davies, D. and Miller, D.C. (1971). A variable pitch fan for an ultra quiet demonstrator engine. 1976 Spring Convention: Seeds for Success in Civil Aircraft Design in the Next Two Decades. pp. 1-18.
Middleton, P. (1971). 614: VFW's jet feederliner. Flight International, Nov. 4, 1971. p. 725, 729-732.
Schaefer, J.W., Sagerser, D.R., and Stakolich, E.G. (1977). Dynamics of high-bypass-engine thrust reversal using a variable-pitch fan. Technical Report prepare for NASA. NASA-TM-X-3524. May 1, 1977. pp. 1-33.
Savelle, S.A. and Garrard, G.D. (1996). Application of transient and dynamic simulations to the U.S. Army T55-L-712 helicopter engine. The American Society of Mechanical Engineers. Presented Jun. 10-13, 1996. pp. 1-8.
Drago, R.J. and Margasahayam, R.N. (1987). Stress analysis of planet gears with integral bearings; 3D finite-element model development and test validation. 1987 MSC NASTRAN World Users Conference. Los Angeles, CA. Mar. 1987. pp. 1-14.
Baker, R.W. (2000). Membrane technology and applications. New York, NY: McGraw-Hill. pp. 87-153.
Cheryan, M. (1998). Ultrafiltration and microfiltration handbook. Lancaster, PA: Tecnomic Publishing Company, Inc. pp. 171-236.
Seader, J.D. and Henley, E.J. (1998). Separation process principles. New York, NY: John Wiley & Sons, Inc. pp. 722-726 and 764-771.
Spadaccini, L.J., and Huang, H. (2002). On-line fuel deoxygenation for coke suppression. ASME, Jun. 2002. pp. 1-7.
Darrah, S. (1987). Jet fuel deoxygenation. Interim Report for Period Mar. 1987-Jul. 1988. pp. 1-22.
Bucknell, R.L. (1973). Influence of fuels and lubricants on turbine engine design and performance, fuel and lubricant analyses. Final Technical Report, Mar. 1971-Mar. 1973. pp. 1-252.
Hazlett, R.N. (1991). Thermal oxidation stability of aviation turbine fuels. Philadelphia, PA: ASTM. pp. 1-163.
Taylor, W.F. (1974). Deposit formation from deoxygenated hydrocarbons. I. General features. Ind. Eng. Chem., Prod. Res. Develop., vol. 13(2). 1974. pp. 133-138.
Taylor, W.F. (1974). Deposit formation from deoxygenated hydrocarbons. II. Effect of trace sulfur compounds. Ind. Eng. Chem., Prod. Res. Dev., vol. 15(1). 1974. pp. 64-68.
Taylor, W.F. and Frankenfeld, J.W. (1978). Deposit fromation from deoxygenated hydrocarbons. 3. Effects of trace nitrogen and oxygen compounds. Ind. Eng. Chem., Prod. Res. Dev., vol. 17(1). 1978. pp. 86-90.
Frankenfeld, J.W. and Taylor, W.F. (1980). Deposit fromation from deoxygenated hydrocarbons. 4. Studies in pure compound systems. Ind. Eng. Chem., Prod. Res. Dev., vol. 19(1). 1978. pp. 65-70.
Hemighaus, G., Boval, T., Bacha, J., Barnes, F., Franklin, M., Gibbs, L., . . . Morris, J. (2007). Aviation fuels: Technical review. Chevron Products Company. pp. 1-94. Retrieved from: https://www.cgabusinessdesk.com/document/aviation_tech_review.pdf.
Spadaccini, L.J., Sobel, D.R., and Huang, H. (2001). Deposit formation and mitigation in aircraft fuels. Journal of Eng. For Gas Turbine and Power, vol. 123. Oct. 2001. pp. 741-746.
Edwards, T. and Zabarnick, S. (1993). Supercritical fuel deposition mechanisms. Ind. Eng. Chem. Res. vol. 32. 1993. pp. 3117-3122.
Huang, H., Sobel, D.R., and Spadaccini, L.J. (2002). Endothermic heat-sink of hydrocarbon fuels for scramjet cooling. AIAA/ASME/SAE/ASEE, Jul. 2002. pp. 1-7.
Bessarabov, D.G., Jacobs, E.P., Sanderson, R.D., and Beckman, I.N. (1996). Use of nonporous polymeric flat-sheet gas-separation membranes in a membrane-liquid contactor: experimental studies. Journal of Membrane Sciences, vol. 113. 1996. pp. 275-284.
Matsumoto, T., Toshiro, U., Kishida, A., Tsutomu, F., Maruyama, I., and Akashi, M. (1996). Novel functional polymers: Poly (dimethylsiloxane)-polyamide multiblock copolymer. VII. Oxygen permeability of aramid-silicone membranes in a gas-membrane-liquid system. Journal of Applied Polymer Science, vol. 64(6). May 9, 1997. pp. 1153-1159.
Technical Data. Teflon. WS Hampshire Inc. Retrieved from: http://catalog.wshampshire.com/Asset/psg_teflon_ptfe.pdf.
Anderson, N.E., Loewenthal, S.H., and Black, J.D. (1984). An analytical method to predict efficiency of aircraft gearboxes. NASA Technical Memorandum prepared for the Twentieth Joint Propulsion Conference. Cincinnati, OH. Jun. 11-13, 1984. pp. 1-25.
Edkins, D.P., Hirschkron, R., and Lee, R. (1972). TF34 turbofan quiet engine study. Final Report prepared for NASA. NASA-CR-120914. Jan. 1, 1972. pp. 1-99.

(56) References Cited

OTHER PUBLICATIONS

Meyer, A.G. (1988). Transmission development of TEXTRON Lycoming's geared fan engine. Technical Paper. Oct. 1988. pp. 1-12.
Dudley, D.W., Ed. (1962). Gear handbook. New York, NY: McGraw-Hill. pp. 14-17 (TOC, Preface, and Index).
Hughes, C. (2002). Aerodynamic performance of scale-model turbofan outlet guide vanes designed for low noise. Prepared for the 40th Aerospace Sciences Meeting and Exhibit. Reno, NV. NASA/TM-2001-211352. Jan. 14-17, 2002. pp. 1-38.
Kaplan, B., Nicke, E., Voss, C. (2006), Design of a highly efficient low-noise fan for ultra-high bypass engines. Proceedings of GT2006 for ASME Turbo Expo 2006: Power for Land, Sea and Air. Barcelona, SP. May 8-11, 2006. pp. 1-10.
Gates, D. Bombardier flies at higher market. Seattle Times. Jul. 13, 2008. pp. C6.
Decker, S. and Clough, R. (2016). GE wins shot at voiding pratt patent in jet-engine clash. Bloomberg Technology. Retrieved from: https://www.bloomberg.com/news/articles/2016-06-30/ge-wins-shot-to-invalidate-pratt-airplane-engine-patent-in-u-s.
Trembley, Jr., H.F. (1977). Determination of effects of ambient conditions on aircraft engine emissions. ALF 502 combustor rig testing and engine verification test. Prepared for Environmental Protection Agency. Sep. 1977. pp. 1-256.
Lewicki, D.G., Black, J.D., Savage, M., and Coy, J.J. (1985). Fatigue life analysis of a turboprop reduction gearbox. NASA Technical Memorandum. Prepared for the Design Technical Conference (ASME). Sep. 11-13, 1985. pp. 1-26.
McCune, M.E. (1993). Initial test results of 40,000 horsepower fan drive gear system for advanced ducted propulsion systems. AIAA 29th Joint Conference and Exhibit. Jun. 28-30, 1993. pp. 1-10.
Wright, G.H. and Russell, J.G. (1990). The M.45SD-02 variable pitch geared fan engine demonstrator test and evaluation experience. Aeronautical Journal., vol. 84(836). Sep. 1980. pp. 268-277.
Drago, R.J. (1974). Heavy-lift helicopter brings up drive ideas. Power Transmission Design. Mar. 1987. pp. 1-15.
Krantz, T.L. (1990). Experimental and analytical evaluation of efficiency of helicopter planetary stage. NASA Technical Paper. Nov. 1990. pp. 1-19.
Heingartner, P., Mba, D., Brown, D. (2003). Determining power losses in the helical gear mesh; Case Study. ASME 2003 Design Engineering Technical Conferences. Chicago, IL. Sep. 2-6, 2003. pp. 1-7.
Thulin, R.D., Howe, D.C., and Singer, I.D. (1982). Energy efficient engine: High pressure turbine detailed design report. Prepared for NASA. NASA CR-165608. Received Aug. 9, 1984. pp. 1-178.
Reshotko, M., Karchmer, A., Penko, P.F. (1977). Core noise measurements on a YF-102 turbofan engine. NASA TM X-73587. Prepared for Aerospace Sciences Meeting sponsored by the American Institute of Aeronautics and Astronautics. Jan. 24-26, 2977.
Gray, D.E. (1978). Energy efficient engine preliminary design and integration studies. Prepared for NASA. NASA CR-135396. Nov. 1978. pp. 1-366.
Reynolds, C.N. (1985). Advanced prop-fan engine technology (APET) single- and counter-rotation gearbox/pitch change mechanism. Prepared for NASA. NASA CR-168114 (vol. I). Jul. 1985. pp. 1-295.
McArdle, J.G. and Moore, A.S. (1979). Static test-stand performance of the YF-102 turobfan engine with several exhaust configurations for the Quiet Short-Haul Research Aircraft (QSRA). Prepared for NASA. NASA-TP-1556. Nov. 1979. pp. 1-68.
Mattingly, J.D. (1996). Elements of gas turbine propulsion. New York, New York: McGraw-Hill, Inc. pp. 1-18, 60-62, 85-87, 95-104, 121-123, 223-234, 242-245, 278-285, 303-309, 323-326, 462-479, 517-520, 563-565, 630-632, 668-670, 673-675, 682-685, 697-705, 726-727, 731-732, 802-805, 828-830 and appendices.
Falchetti, F., Quiniou, H., and Verdier, L. (1994). Aerodynamic design and 3D Navier-Stokes analysis of a high specific flow fan. ASME. Presented at the International Gas Turbine and Aeroengine Congress and Exposition. The Hague, Netherlands. Jun. 13-16, 1994. pp. 1-10.

Datasheet. CF6-80C2 high-bypass turbofan engines. Retreived from https://geaviation.com/sites/default/files/datasheet-CF6-80C2.pdf.
Salemme, C.T. and Murphy, G.C. (1979). Metal spar/superhybrid shell composite fan blades. Prepared for NASA. NASA-CR-159594. Aug. 1979. pp. 1-127.
"Press release. The GE90 engine. Retrieved from: https://www.geaviation.com/commercial/engines/ge90-engine; https://www.geaviation.com/press-release/ge90-engine-family/ge90-115b-fan-completing-blade-testing-schedule-first-engine-test; and https://www.geaviation.com/press-release/ge90-engine-family/ge'scomposite-fan-blade-revolution-turns-20-years-old".
Datasheet. Genx™ high bypass turbofan engines. Retreived from: https://www.geaviation.com/sites/default/files/datasheet-genx.pdf.
Optimised Gearbox Design for Modern Wind Turbines. Hicks, Cunliffe and Gifer; Nov. 20, 20014.
ANSI-AGMA 9004-A99 Flexible Couplings—Mass Elastic Properties and Other Characteristics.AGMA Standard. Approved Aug. 3, 1999.
ANSI-AGMA 6123-B06—IDesign Manual for Enclosed Epicyclic Gear Drives—AGMA Standard. Approved Sep. 20, 2006.
ANSI-AGMA 940-A09—Double Helical Epicyclic Gear Units. AGMA Information Sheet. Approved Jan. 6, 2009.
Youtube video; "PurePower PW1000G Engine: Customer Testimonials", published Jul. 26, 2010 (~seconds 43-63) available at https:www.youtube.com/watch?v=vgQgEftEd8c on Aug. 9, 2018.
Request for Opinion filed by Rolls Royce on Jul. 11, 2018 for European Patent No. EP2532858B1 granted Oct. 19, 2016.
Request for Opinion filed by Rolls Royce on Jul. 11, 2018 for European Patent No. EP2737180B1 granted Apr. 13, 2016.
Request for Opinion filed by Rolls Royce on Jul. 11, 2018 for European Patent No. EP2532841B1 granted Apr. 27, 2016.
Response to Observations by Patantee filed by Rolls Royce on Jan. 18, 2019 for European Patent No. EP2532858B1 granted Oct. 19, 2016.
Response to Observations by Patantee filed by Rolls Royce on Jul. 18, 2018 for European Patent No. EP2737180B1 granted Apr. 13, 2016.
Response to Observations by Patantee filed by Rolls Royce on Jul. 18, 2018 for European Patent No. EP2532841B1 granted Apr. 27, 2016.
EP Office Action for European Application No. 16174051.9 dated Oct. 15, 2018.
EP Office Action for European Application No. 17199484.1 dated Jan. 2, 2019.
EP Office Action for European Application No. 16159312.4 dated Oct. 16, 2018.
Summons to Attend Oral Proceedings for European Patent Application No. 13822569.3 (2841718) dated Oct. 23, 2019.
Brief Communication from Opponent after Oral Proceedings for European Patent Application No. 13743283.7 (2809932) by Safran Aircraft Engines dated Dec. 2, 2019.
Third Party Observations for European Patent Application No. 13777804.9 (2809940) by Rolls-Royce dated Nov. 21, 2019.
Summons to Attend Oral Proceedings for European Patent Application No. 13778330.4 (2809922) dated Dec. 2, 2019.
Summons to Attend Oral Proceedings for European Patent Application No. 13777804.9 dated Dec. 10, 2019.
Third Party Observations for European Patent Application No. 12170483.7 by Rolls-Royce dated Oct. 24, 2019.
Response to the Summons of Oral Proceedings for European Patent No. 3051078 by Rolls-Royce dated Oct. 17, 2019.
Response to the Summons of Oral Proceedings for European Patent No. 2949882 by Rolls-Royce dated Oct. 9, 2019.
Response to the Summons of Oral Proceedings for European Patent No. 2949882 by Safran dated Oct. 9, 2019.
"Type-Certificate Data Sheet for PW1500G Series Engines" EASA, Application Date Feb. 2, 2010.
Third Party Observations and Concise Description of Relevance of Document for U.S. Appl. No. 15/185,292 mailed Jul. 5, 2018.
P&W Propulsion Systems Studies, NASA High Speed Research Workshop, May 14-16, 1991.
Third Party Observations and Concise Description of Relevance of Document for U.S. Appl. No. 15/881,240 mailed Aug. 31, 2018.

(56) References Cited

OTHER PUBLICATIONS

*Dr. Raymond G. Tronzo v. Biomet Inc.*, 156 F.3d 1154 (1998).
Third Party Observations and Concise Description of Relevance of Document for U.S. Appl. No. 15/856,396 mailed Aug. 31, 2018. Prior Art Direct Drive Engines.
Energy Efficient Engine High-Pressure Turbine Uncooled Rig Technology Report, NASA CR-16149, Oct. 1981.
Third Party Observations and Concise Description of Relevance of Document for U.S. Appl. No. 15/816,487 mailed Jul. 25, 2018.
Notice of Opposition for European Patent No. 3051078 filed Jul. 31, 2018.
Decision Denying Institution of Inter Partes Review. *General Electric Company.*, Petitioner, v. *United Technologies Corp.*, Patent Owner. IPR2017-00522. U.S. Pat. No. 8,899,915. Entered Jun. 23, 2017. pp. 1-18.
Declaration of Magdy Attia. In re U.S. Pat. No. 8,899,915. IPR2017-0522. Executed Dec. 21, 2016. pp. 1-72.
Petition for Inter Partes Review of U.S. Pat. No. 8,899,915. *General Electric Company*, Petitioner, v. *United Technologies Corporation*, Patent Owner. IPR2017-00522. Dec. 21, 2016.
Patent Owner's Preliminary Response. *General Electric Company.*, Petitioner, v. *United Technologies Corp.*, Patent Owner. IPR2017-00522. U.S. Pat. No. 8,899,915. Entered Apr. 19, 2017. pp. 1-54.
Red Aviation. Part or Material Certification Form for various engine components. Dated Apr. 5, 2017.
Rethinking jet engines to make commercial aviation less of a threat to the climate (and the human respiratory system). Fortune. Retrieved Sep. 29, 2016 from: http://beta.fortune.com/change-the-world/united-technologies-8.
Krauskopf, L. & Shumaker, L. (2014). GE exec says avoided geared design in jet engine battle with Pratt. Reuters. Sep. 15, 2014. http://www.reuters.com/article/us-general-electric-united-tech-engine-idUSKBN0HA2H620140915.
Grose, T.K. (2013). Reshaping flight for fuel efficiency: Five technologies on the runway. National Geographic. Retrieved Mar. 16, 2016 from: http://news.nationalgeographic.com/news/energy/2013/04/130423-reshaping-flight-for-fuel-efficiency.html.
European Search Report for European Application No. 16197349.0 dated Mar. 20, 2017.
Reynolds, C.N. (1985). Advanced prop-fan engine technology (APET) single- and counter-rotation gearbox/pitch change mechanism. Prepared for NASA. NASA CR-168114 (vol. II). Jul. 1985. pp. 1-175.
English translation of Measurement and calculation methodology on TFE731-2, TFE731-3A and TFE731-3D models.
English translation of Expert certificate concerning the technical nature of the drawings used in the measurement and calculation methodology.
Declaration of Raymond Drago. In re U.S. Pat. No. 8,297,916. IPR2018-01172. Executed May 29, 2018. pp. 1-115.
Declaration of Courtney H. Bailey. In re U.S. Pat. No. 8,511,605. Executed Jul. 19, 2016. pp. 1-4.
Petition for Inter Partes Review of U.S. Pat. No. 8,297,916. *General Electric Company*, Petitioner, v. *United Technologies Corporation*, Patent Owner. IPR2018-01171. Filed May 30, 2018.
Petition for Inter Partes Review of U.S. Pat. No. 8,297,916. *General Electric Company*, Petitioner, v. *United Technologies Corporation*, Patent Owner. IPR2018-01172. Filed May 30, 2018.
English Translation of Notice of Opposition to Patent No. EP2949882. United Technologies Corporation opposed by Rolls Royce. Mailed Aug. 23, 2017.
English Translation of Notice of Opposition to Patent No. EP2811120. United Technologies Corporation opposed by Safran Aircraft Engines. Mailed Jul. 12, 2017.
English Translation of Notice of Opposition to Patent No. EP299882. United Technologies Corporation opposed by Safran Aircraft Engines. Mailed May 23, 2018.
English Translation of Notice of Opposition to Patent No. EP2811120. United Technologies Corporation opposed by Rolls Royce. Issued on Apr. 12, 2018.
Third Party Observations for European Patent Application No. 16159312.4 filed Jun. 22, 2018. Mailed Jul. 3, 2018.
Third Party Observations for European Patent Application No. 11250208.3 filed Jul. 20, 2018. Mailed Jul. 26, 2018.
Third Party Observations for European Patent Application No. 17199484.1 filed Jul. 5, 2018. Mailed Jul. 12, 2018.
Third Party Observations for European Patent Application No. 13775188.9 filed Sep. 10, 2018. Mailed Sep. 17, 2018.
McMillian, A. (2008) Material development for fan blade containment casing. Abstract. p. 1. Conference on Engineering and Physics: Synergy for Success 2006. Journal of Physics: Conference Series vol. 105. London, UK. Oct. 5, 2006.
Kurzke, J. (2009). Fundamental differences between conventional and geared turbofans. Proceedings of ASME Turbo Expo: Power for Land, Sea, and Air. 2009, Orlando, Florida. pp. 145-153.
Agarwal, B.D and Broutman, L.J. (1990). Analysis and performance of fiber composites, 2nd Edition. John Wiley & Sons, Inc. New York: New York. pp. 1-30, 50-51, 56-58, 60-61, 64-71, 87-89, 324-329, 436-437.
Carney, K., Pereira, M. Revilock, and Matheny, P. (2003). Jet engine fan blade containment using two alternate geometries. 4th European LS-DYNA Users Conference. pp. 1-10.
Brines, G.L. (1990). The turbofan of tomorrow. Mechanical Engineering: The Journal of the American Society of Mechanical Engineers,108(8), 65-67.
Faghri, A. (1995). Heat pipe and science technology. Washington, D.C.: Taylor & Francis, pp. 1-60.
Hess, C. (1998). Pratt & Whitney develops geared turbofan. Flug Revue 43(7). Oct. 1998.
Grady, J.E., Weir, D.S., Lamoureux, M.C., and Martinez, M.M. (2007). Engine noise research in NASA's quiet aircraft technology project. Papers from the International Symposium on Air Breathing Engines (ISABE). 2007.
Griffiths, B. (2005). Composite fan blade containment case. Modern Machine Shop. Retrieved from: http://www.mmsonline.com/articles/composite-fan-blade-containment-case pp. 1-4.
Hall, C.A. and Crichton, D. (2007). Engine design studies for a silent aircraft. Journal of Turbomachinery, 129, 479-487.
Haque, A. and Shamsuzzoha, M., Hussain, F., and Dean, D. (2003). S20-glass/epoxy polymer nanocomposites: Manufacturing, structures, thermal and mechanical properties. Journal of Composite Materials, 37(20), 1821-1837.
Brennan, P.J. and Kroliczek, E.J. (1979). Heat pipe design handbook. Prepared for National Aeronautics and Space Administration by B & K Engineering, Inc. Jun. 1979. pp. 1-348.
Horikoshi, S. and Serpone, N. (2013). Introduction to nanoparticles. Microwaves in nanoparticle synthesis. Wiley-VCH Verlag GmbH & Co. KGaA. pp. 1-24.
Kerrebrock, J.L. (1977). Aircraft engines and gas turbines. Cambridge, MA: The MIT Press. p. 11.
Xie, M. (2008). Intelligent engine systems: Smart case system. NASA/CR-2008-215233. pp. 1-31.
Knip, Jr., G. (1987). Analysis of an advanced technology subsonic turbofan incorporating revolutionary materials. NASA Technical Memorandum. May 1987. pp. 1-23.
Willis, W.S. (1979). Quiet clean short-haul experimental engine (QCSEE) final report. NASA/CR-159473 pp. 1-289.
Kojima, Y., Usuki, A. Kawasumi, M., Okada, A., Fukushim, Y., Kurauchi, T., and Kamigaito, O. (1992). Mechanical properties of nylon 6-clay hybrid. Journal of Materials Research, 8(5), 1185-1189.
Kollar, L.P. and Springer, G.S. (2003). Mechanics of composite structures. Cambridge, UK: Cambridge University Press. p. 465.
Ramsden, J.M. (Ed). (1978). The new European airliner. Flight International, 113(3590). Jan. 7, 1978. pp. 39-43.
Langston, L. and Faghri, A. Heat pipe turbine vane cooling. Prepared for Advanced Turbine Systems Annual Program Review. Morgantown, West Virginia. Oct. 17-19, 1995. pp. 3-9.
Oates, G.C. (Ed). (1989). Aircraft propulsion systems and technology and design. Washington, D.C.: American Institute of Aeronautics, Inc. pp. 341-344.

(56) References Cited

OTHER PUBLICATIONS

Lau, K., Gu, C., and Hui, D. (2005). A critical review on nanotube and nanotube/nanoclay related polymer composite materials. Composites: Part B 37(2006) 425-436.

Shorter Oxford English dictionary, 6th Edition. (2007). vol. 2, N-Z. p. 1888.

Lynwander, P. (1983). Gear drive systems: Design and application. New York, New York: Marcel Dekker, Inc. pp. 145, 355-358.

Sweetman, B. and Sutton, O. (1998). Pratt & Whitney's surprise leap. Interavia Business & Technology, 53.621, p. 25.

Mattingly, J.D. (1996). Elements of gas turbine propulsion. New York, New York: McGraw-Hill, Inc. pp. 8-15.

Pyrograf-III Carbon Nanofiber. Product guide. Retrieved Dec. 1, 2015 from: http://pyrografproducts.com/Merchant5/merchant.mvc?Screen=cp_nanofiber.

Nanocor Technical Data for Epoxy Nanocomposites using Nanomer 1.30E Nanoclay. Nnacor, Inc. Oct. 2004.

Ratna, D. (2009). Handbook of thermoset resins. Shawbury, UK: iSmithers. pp. 187-216.

Wendus, B.E., Stark, D.F., Holler, R.P., and Funkhouser, M.E. (2003). Follow-on technology requirement study for advanced subsonic transport. NASA/CR-2003-212467. pp. 1-37.

Silverstein, C.C., Gottschlich, J.M., and Meininger, M. The feasibility of heat pipe turbine vane cooling. Presented at the International Gas Turbine and Aeroengine Congress and Exposition, The Hague, Netherlands. Jun. 13-16, 1994. pp. 1-7.

Merriam-Webster's collegiate dictionary, 11th Ed. (2009). p. 824.

Merriam-Webster's collegiate dictionary, 10th Ed. (2001). p. 1125-1126.

Hughes, C. (2010). Geared turbofan technology. NASA Environmentally Responsible Aviation Project. Green Aviation Summit. NASA Ames Research Center. Sep. 8-9, 2010. pp. 1-8.

Gliebe, P.R. and Janardan, B.A. (2003). Ultra-high bypass engine aeroacoustic study. NASA/CR-2003-21252. GE Aircraft Engines, Cincinnati, Ohio. Oct. 2003. pp. 1-103.

Moxon, J. How to save fuel in tomorrow's engines. Flight International. Jul. 30, 1983. 3873(124). pp. 272-273.

File History for U.S. Appl. No. 12/131,876.

Fledderjohn, K.R. (1983). The TFE731-5: Evolution of a decade of business jet service. SAE Technical Paper Series. Business Aircraft Meeting & Exposition. Wichita, Kansas. Apr. 12-15, 1983. pp 1-12.

Gunston, B. (Ed.) (2000). Jane's aero-engines, Issue seven. Coulsdon, Surrey, UK: Jane's Information Group Limited. pp. 510-512.

Ivchenko-Progress D-436. Jane's Aero-engines, Aero-engines—Turbofan. Feb. 8, 2012.

Ivchenko-Progress AI-727M. Jane's Aero-engines, Aero-engines—Turbofan. Nov. 27, 2011.

Ivchenko-Progress D-727. Jane's Aero-engines, Aero-engines—Turbofan. Feb. 7, 2007.

Turbomeca Aubisque. Jane's Aero-engines, Aero-engines—Turbofan. Nov. 2, 2009.

Aviadvigatel D-110. Jane's Aero-engines, Aero-engines—Turbofan. Jun. 1, 2010.

Rolls-Royce M45H. Jane's Aero-engines, Aero-engines—Turbofan. Feb. 24, 2010.

Honeywell LF507. Jane's Aero-engines, Aero-engines—Turbofan. Feb. 9, 2012.

Honeywell TFE731. Jane's Aero-engines, Aero-engines—Turbofan. Jul. 18, 2012.

NASA Conference Publication. Quiet, powered-lift propulsion. Cleveland, Ohio. Nov. 14-15, 1978. pp. 1-420.

"Civil Turbojet/Turbofan Specifications", Jet Engine Specification Database (Apr. 3, 2005).

Kandebo, S.W. (1993). Geared-turbofan engine design targets cost, complexity. Aviation Week & Space Technology, 148(8). Start p. 32.

Hendricks, E.S. and Tong, M.T. (2012). Performance and weight estimates for an advanced open rotor engine. NASA/TM-2012-217710. pp. 1-13.

Guynn, M. D., Berton, J.J., Fisher, K. L., Haller, W.J., Tong, M. T., and Thurman, D.R. (2011). Refined exploration of turbofan design options for an advanced single-aisle transport. NASA/TM-2011-216883. pp. 1-27.

Zalud, T. (1998). Gears put a new spin on turbofan performance. Machine Design, 70(20), p. 104.

Kurzke, J. (2008). Preliminary Design, Aero-engine design: From state of the art turbofans towards innovative architectures. pp. 1-72.

Zamboni, G. and Xu, L. (2009). Fan root aerodynamics for large bypass gas turbine engines: Influence on the engine performance and 3D design. Proceedingsof ASME Turbo Expo 2009: Power for Land, Sea and Air. Jun. 8-12, 2009, Orlando, Florida, USA. pp. 1-12.

Han, J., Dutta, S., and Ekkad, S.V. (2000). Gas turbine heat transfer and cooling technology. New York, NY: Taylor & Francis. pp. 1-25, 129-157, and 160-249.

Mattingly, J.D. (1996). Elements of gas turbine propulsion. New York, New York: McGraw-Hill, Inc. pp. 1-18, 60-62, 85-87, 95-104, 121-123, 223-234, 242-245, 278-280, 303-309, 323-326, 462-479, 517-520, 563-565, 673-675, 682-685, 697-699, 703-705, 802-805, 862-864, and 923-925.

Declaration of Reza Abhari, Ph.D. In re U.S. Pat. No. 8,844,265. Executed Jun. 28, 2016. pp. 1-91.

Declaration of John Eaton, Ph.D. In re U.S. Pat. No. 8,869,568. Executed Mar. 28, 2016. pp. 1-87.

Declaration of Reza Abhari. In re U.S. Pat. No. 8,695,920. Executed Nov. 30. pp. 1-67.

Declaration of Reza Abhari. In re U.S. Pat. No. 8,448,895. Executed Nov. 28. pp. 1-81.

Declaration of Reza Abhari. In re U.S. Pat. No. 8,695,920, claims 1-4, 7-14, 17 and 19. Executed Nov. 29. pp. 1-102.

Declaration of Dr. Magdy Attia. In re U.S. Pat. No. 8,313,280. Executed Oct. 21, 2016. pp. 1-88.

Lord, W.K., MacMartin, D.G., and Tillman, T.G. (2000). Flow control opportunities in gas turbine engines. American Institute of Aeronautics and Astronautics. pp. 1-15.

Daly, M. Ed. (2010). Jane's Aero-Engine. Issue Twenty-seven. Mar. 2010. p. 633-636.

Roux, E. (2007). Turbofan and turbojet engines database handbook. Editions Elodie Roux. Blagnac: France, pp. 1-595.

Wilfert, G. (2008). Geared fan. Aero-Engine Design: From State of the Art Turbofans Towards Innovative Architectures, von Karman Institute for Fluid Dynamics, Belgium, Mar. 3-7, 2008. pp. 1-26.

Declaration of Dr. Magdy Attia. In re U.S. Pat. No. 8,517,668. Executed Dec. 8, 2016. pp. 1-81.

Cramoisi, G. Ed. (2012). Death in the Potomac: The crash of Air Florida Flight 90. Air Crash Investigations. Accident Report NTSB/AAR-82-8. p. 45-47.

Norton, M. and Karczub, D. (2003). Fundamentals of noise and vibration analysis for engineers. Press Syndicate of the University of Cambridge. New York: New York. p. 524.

U.S. Department of Transportation: Federal Aviation Administration Advisory Circular. Runway overrun prevention. Dated: Nov. 6, 2007. p. 1-8 and Appendix 1 p. 1-15, Appendix 2 p. 1-6, Appendix 3 p. 1-3, and Appendix 4 p. 1-5.

U.S. Department of Transportation: Federal Aviation Administration Advisory Circular. Standard operating procedures for flight deck crewmembers. Dated: Feb. 27, 2003.. p. 1-6 and Appendices.

Vasudevan, A.K. and Petrovic, J.J. (1992). A comparative overview of molybedenum disilicide composites. Materials Science and Engineering, A155, 1992. pp. 1-17.

Clarke, D.R. and Levi, C.G. (2003). Materials design for the next generation thermal barrier coatings. Annual. Rev. Mater. Res. vol. 33. 2003. pp. 383-417.

Lee, K.N. (2000). Current status of environmental barrier coatings for Si-Based ceramics. Surface and Coatings Technology 133-134, 2000. pp. 1-7.

Bornstein, N. (1993). Oxidation of advanced intermetallic compounds. Journal de Physique IV, 1993, 03 (C9), pp. C9-367-C9-373.

Krenkel, W., Naslain, R., and Schneider, H. Eds. (2001). High temperature ceramic matrix composites pp. 224-229. Weinheim, DE: Wiley-VCH Verlag GmbH.

(56) References Cited

OTHER PUBLICATIONS

Gibala, R., Ghosh, A.K., Van Aken, D.C., Srolovitz, D.J., Basu, A., Chang, H., . . . Yang, W. (1992). Mechanical behavior and interface design of MoSi2-based alloys and composites. Materials Science and Engineering, A155, 1992 pp. 147-158.

Shah, D.M. (1992). MoSi2 and other silicides as high temperature structural materials. Superalloys 1992. The Minerals, Metals, & Materials Society. pp. 409-422.

Zhao, J.C. and Westbrook, J.H. (2003). Ultrahigh-temperature materials for jet engines. MRS Bulletin. vol. 28(9). Sep. 2003. pp. 622-630.

Tsirlin, M., Pronin, Y.E., Florina, E.K., Mukhametov, S. Kh., Khatsernov, M.A., Yun, H.M., . . . Kroke, E. (2001). Experimental investigation of multifunctional interphase coatings on SiC fibers for non-oxide high temperature resistant CMCs. High Temperature Ceramic Matrix Composites. 4th Int'l Conf. on High Temp. Ceramic Matrix Composites. Oct. 1-3, 2001. pp. 149-156.

Jacobson, N.S. (1993). Corrosion of silicon-based ceramics in combustion environments. J. Am. Ceram. Soc. 76(1). pp. 3-28.

Jorgensen, P.J., Wadsworth, M.E., and Cutler, I.B. (1961). Effects of water vapor on oxidation of silicon carbide. J. Am. Ceram. Soc. 44(6). pp. 248-261.

Xu, Y., Cheng, L., Zhang, L., Ying, H., and Zhou, W. (1999). Oxidation behavior and mechanical properties of C/SiC composites with Si—MoSi2 oxidation protection coating. J. of Mat. Sci. vol. 34. 1999. pp. 6009-6014.

Sundaram, S.K., Hsu, J-Y., Speyer, R.F. (1995). Molten glass corrosion resistance of immersed combustion-heating tube materials in e-glass. J. Am. Ceram. Soc. 78(7). pp. 1940-1946.

Jeng, Y.-L., Lavernia, E.J. (1994). Processing of molybdenum disilicide. J. of Mat. Sci. vol. 29. 1994. pp. 2557-2571.

Suzuki, Y., Morgan, P.E.D., and Niihara, K. (1998). Improvement in mechanical properties of powder-processed MoSi2 by the addition of Sc2O3 and Y2O3. J. Am. Ceram. Soci. 81(12). pp. 3141-3149.

Webster, J.D., Westwood, M.E., Hayes, F.H., Day, R.J., Taylor, R., Duran, A., . . . Vogel, W.D. (1998). Oxidation protection coatings for C/SiC based on yttrium silicate. Journal of European Ceramic Society vol. 18. 1998. pp. 2345-2350.

Petrovic, J.J., Castro, R.G., Vaidya, R.U., Peters, M.I., Mendoza, D., Hoover, R.C., and Gallegos, D. E. (2001). Molybdenum disilicide materials for glass melting sensor sheaths. Ceramic Engineering and Science Proceedings. vol. 22(3). 2001. pp. 59-64.

Kahn, H., Tayebi, N., Ballarini, R., Mullen, R.L., Heuer, A.H. (2000). Fracture toughness of polysilicon MEMS devices. Sensors and Actuators vol. 82. 2000. pp. 274-280.

Muhlstein, C.L., Stach, E.A., and Ritchie, R.O. (2002). A reaction-layer mechanism for the delayed failure of micron-scale polycrystalline silicon structural films subjected to high-cycle fatigue loading. Acta Materialia vol. 50. 2002. pp. 3579-3595.

Sundaram, S.K., Hsu, J-Y., Speyer, R.F. (1994). Molten glass corrosion resistance of immersed combustion-heating tube materials in soda-lime-silicate glass. J. Am. Ceram. Soc. 77(6). pp. 1613-1623.

Leckie, F.A. and Dal Bello, D.J. (2009). Strength and stiffness of engineering systems. Mechanical Engineering Series. Springer. pp. 1-3.

El-Sayad, A.F. (2008). Aircraft propulsion and gas turbine engines. Boca Raton, FL: CRC Press. pp. 215-219 and 855-860.

Bunker, R.S. (2005). A review of shaped hole turbine film-cooling technology. Journal of Heat Transfer vol. 127. Apr. 2005. pp. 441-453.

Decision of the Opposition Division for European Patent No. 2811120 (14155460.0) mailed Jan. 15, 2020.

Third Party Observations of European Patent Application No. 18191325.2 (EP 3608515) mailed Mar. 10, 2020 by Rolls Royce.

Third Party Observations of European Patent Application No. 18191325.2 (EP 3608515) mailed Mar. 6, 2020 by Rolls Royce.

Third Party Observations of European Patent Application No. 18191333.6 (EP 3467273) mailed Mar. 9, 2020 by Rolls Royce.

Annexe Mesures—Methodologie de mesure et de calcul. STF495M-4 and STF495M-5. Cited in: Documents cited by Rolls-Royce in anticipation of Oral Proceedings for Opposition of European Patent No. 2809932 dated Jan. 20, 2020.

(1987). Wide-chord fan—12 years of development. Aircraft Engineering and Aerospace Technology. vol. 59, issue 7. pp. 10-11. Retrieved Jul. 31, 2008 from: https://doi.org/10.1108/eb036471.

Mattingly, J.D., Heiser, W.H., and Pratt, D.T. (2002). Aircraft engine design. Reston, VA: American Institute of Aeronautics and Astronautics. p. 290-292.

Winn, A. (Ed). (1990). Wide Chord Fan Club. Flight International, 4217(137). May 23-29, 1990. pp. 34-38.

Parker, R.G. and Lin, J. (2001). Modeling, modal properties, and mesh stiffness variation instabilities of planetary gears. Prepared for NASA. NASA/CR-2001-210939. May 2001. pp. 1-111.

Mancuso, J R. and Corcoran, J.P. (2003). What are the differences in high performance flexible couplings for turbomachinery? Proceedings of the Thirty-Second Turbomachinery Symposium. 2003. pp. 189-207.

Dudley, D.W., Ed. (1954). Handbook of practical gear design. Lancaster, PA: Technomic Publishing Company, Inc. pp. 3.96-102 and 8.12-18.

Dudley, D.W., Ed. (1962). Gear handbook. New York, NY: McGraw-Hill. pp. 3.14-18 and 12.7-12.21.

Dudley, D.W., Ed. (1994). Practical gear design. New York, NY: McGraw-Hill. pp. 119-124.

Product Brochure. Garrett TFE731. Allied Signal. Copyright 1987. pp. 1-24.

Honeywell Learjet 31 and 35/36 TFE731-2 to 2C Engine Upgrade Program. Sep. 2005. pp. 1-4.

Honeywell Sabreliner 65 TFE731-3 to -3D Engine Upgrade Program. Oct. 2005. pp. 1-4.

U.S. Department of Transportation: Federal Aviation Administration Type Certificate Data Sheet No. E6WE. Dated: May 9, 2000. p 1-.

Kurzke, J. (2012). GasTurb 12: Design and off-design performance of gas turbines. Retrieved from: https://www.scribd.com/document/153900429/GasTurb-12.

Ahmad, F. and Mizramoghadam, A.V. (1999). Single v. two stage high pressure turbine design of modern aero engines. ASME. Prestend at the International Gast Turbine & Aeroengine Congress & Exhibition. Indianapolis, Indiana. Jun. 7-10, 1999. pp. 1-9.

Riegler, C., and Bichlmaier, C. (2007). The geared turbofan technology—Opportunities, challenges and readiness status. Porceedings CEAS. Sep. 10-13, 2007. Berlin, Germany. pp. 1-12.

About GasTurb. Retrieved Jun. 26, 2018 from: http://gasturb.de/about-gasturb.html.

Kurzke, J. (2001). GasTurb 9: A porgram to calculate design and off-design performance of gas turbines. Retrieved from: https://www.scribd.com/document/92384867/GasTurb9Manual.

Tummers, B. (2006). DataThief III. Retreived from: https://datathief.org/DatathiefManual.pdf pp. 1-52.

Manual. Student's Guide to Learning SolidWorks Software. Dassault Systemes—SolidWorks Corporation. pp. 1-156.

MacIsaac, B. and Langston, R. (2011). Gas turbine propulsion systems. Chichester, West Sussex: John Wiley & Sons, Ltd. pp. 260-265.

Datasheet. CFM56-5B For the Airbus A320ceo family and CFM56-7B for the Boeing 737 family. https://www.cfmaeroengines.com/.

Turner, M. G., Norris, A., and Veres, J.P. (2004). High-fidelity three-dimensional simulation of the GE90. NASA/TM-2004-212981. pp. 1-18.

Defeo, A. and Kulina, M. (1977). Quiet clean short-haul experimental engine (QCSEE) main reduction gears detailed design final report. Prepared for NASA. NASA-CR-134872. Jul. 1977. pp. 1-221.

Amezketa, M., Iriarte, X., Ros, J., and Pintor, J. (2009). Dynamic model of a helical gear pair with backlash and angle0varying mesh stiffness. Multibody Dynamics 2009, ECCOMAS Thematic Conference. 2009. pp. 1-36.

Singh, A. (2005). Application of a system level model to study the planetary load sharing behavior. Jounal of Mechanical Design. vol. 127. May 2005. pp. 469-476.

(56) References Cited

OTHER PUBLICATIONS

Smith-Boyd, L. and Pike, J. (1986). Expansion of epicyclic gear dynamic analysis program. Prepared for NASA. NASA CR-179563. Aug. 1986. pp. 1-98.
Wikipedia. Torsion spring. Retreived Jun. 29, 2018 from: https://en.wikipedia.org/wiki/Torsion_spring.
AGMA Standard (2006). Design manual for enclosed epicyclic gear drives. Alexandria, VA: American Gear Manufacturers Association. pp. 1-104.
AGMA Standard (1997). Design and selection of components for enclosed gear drives, lexandria, VA: American Gear Manufacturers Association. pp. 1-48.
Daly, M. Ed. (2007). Jane's Aero-Engine. Issue Twenty-three. Mar. 2008. p. 707-12.
AGMA Standard (1999). Flexible couplings—Mass elastic properties and other characteristics. Alexandria, VA: American Gear Manufacturers Association. pp. 1-46.
Wikipedia. Stiffness. Retrieved Jun. 28, 2018 from: https://en.wikipedia.org/wiki/Stiffness.
Damerau, J. (2014) What is the mesh stiffness of gears? Screen shot of query submitted by Vahid Dabbagh, answered by Dr. Jochan Damerau, Research General Manager at Bosch Corp., Japan. Retrieved from: https://www.researchgate.net/post/What_is_the_mesh_stiffness_of_gears.
Hill, P.G., Peterson, C.R. (1965). Mechanics and thermodynamics of propulsion. Addison-Wesley Publishing Company, Inc. pp. 307-308.
Hill, P.G., Peterson, C.R. (1992). Mechanics and thermodynamics of propulsion, 2nd Edition. Addison-Wesley Publishing Company, Inc. pp. 400-406.
Kasuba, R. and August, R. (1984). Gear mesh stiffness and load sharing in planetary gearing. American Society of Mechanical Engineers, Design Engineering Technical Conference, Cambridge, MA. Oct. 7-10, 1984. pp. 1-6.
Ciepluch, C. (1977). Quiet clean short-haul experimental engine (QCSEE) under-the-wing (UTW) final design report. Prepared for NASA. NASA-CP-134847. Retreived from: https://ntrs.nasa.gov/archive/nasa/casi.ntrs.nasa.gov/19800075257.pdf.
Response to Holder's Response. European Patent No. 2949882 mailed Mar. 12, 2019 by Safran Aircraft Engines.
Decision of the Opposition Division. European Patent No. 2949882 mailed Nov. 26, 2018.
Annexe Mesures—Methodologie de mesure et de calcul.
Third Party Observations of European Patent Application No. 14155460.0 (European Patent Application No. 2811120) mailed Oct. 29, 2018 by Rolls Royce.
Attestation of Philippe Pellier signed Apr. 12, 2017.
Attestation of Didier Escure signed Sep. 17, 2018.
Annex to the Notice un Article 94(3) EPC issued by the Examination Division. European Patent Application No. 13837107.5 mailed Jan. 25, 2019.
Holder's Response to Written Opinion of Sep. 29, 2015. European Patent Application No. 15175205.2 (2949882) dated Jun. 1, 2016.
Mattingly, J.D. (1996). Elements of gas turbine propulsion. New York, New York: McGraw-Hill, Inc. pp. 1-18, 60-62, 85-87, 95-104, 121-123, 223-234, 242-245, 278-285, 303-309, 323-326, 462-479, 517-520, 563-565, 630-632, 668-670, 673-675, 682-685, 697-705, 726-727, 731-733, 802-805, 828-830, 862-864, and 923-927.
Notice of Opposition of European Patent No. 2949881 mailed May 28, 2019 by Safran Aircraft Engines.
Notice of Opposition of European Patent No. 2949881 mailed May 28, 2019 by Rolls-Royce.
Summons to Attend Oral Proceedings for European Patent Application No. 13743283.7 dated May 28, 2019.
Third Party Observations submitted by Rolls-Royce plc for European Patent Application No. 16156289.7 dated Jun. 12, 2019.
Lacaze, J. and Hazotte, A. (1990). Directionally solidified materials: nickel-base superalloys for gas turbines. Textures and Microstructures, 1990, vol. 13, pp. 1-14.
Guynn, M. D., Berton, J.J., Fisher, K. L., Haller, W.J., Tong, M. T., and Thurman, D.R. (2009). Analysis of turbofan design options for an advanced single-aisle transport aircraft. American Institute of Aeronautics and Astronautics, pp. 1-13.
Pratt & Whitney PW8000. Jane's Aero-Engines. Jane's by IHS Markit. Sep. 30, 2010.
Fowler, T.W. Ed. (1989). Jet engines and propulsion systems for engineers. GE Aircraft Engines. Training and Educational Development and the University of Cincinnati for Human Resource Development. pp. 1-516.
Product Brochure. BR710. Rolls-Royce. Copyright 2008. pp. 1-4.
Fanchon, J-L. (1994). Guide de sciences et technologies industrielles. Paris, France: Nathan, Afnor. pp. 359-360.
Le Borzec, R. (1992). Reducteurs de vitesse a engrenages. Techniques de l'lgenieur. Nov. 10, 1992. pp. 1-36.
Praisner, T.J., Grover, E., Mocanu, R., Jurek, R., and Gacek, R. (2010). Predictions of unsteady interactions between closely coupled HP and LP turbines with co-and counter-rotation. Proceedings of ASME Turbo Expo 2010. Jun. 14-18, 2018. Glasgow, UK. p. 1-10.
Bijewitz, J., Seitz, A., Hornung, M., and Luftfahrt, B. (2014). Architectural comparison of advanced ultra-high bypass ratio turbofans for medium to long range application. Deutscher Luft—und Raumfahrtkongress 2014. pp. 1-2.
U.S. Department of Transportation: Federal Aviation Administration Advisory Circular. Engine Overtorque Test, Calibration Test, Endurance Test, and Teardown Inspection for Turbine Engine Certification. Dated: Mar. 9, 2015. p. 1-37 and Appendices.
Gardner, W.B. (1979) Energy efficient engine high pressure turbine uncooled rig technology report. Prepared for NASA. NASA-CR-165149. Oct. 1979. pp. 1-242.
Hendricks, E.S., Jones, S.M., and Gray, J.S. (2014). Design optimization of a variable-speed power-turbine. American Institute of Aeronautics and Astronautics. pp. 1-17.
Mattingly, J.D., Heiser, W.H., and Pratt, D.T. (2002). Aircraft engine design. Reston, VA: American Institute of Aeronautics and Astronautics. p. 292.
Smith, Jr., M.G., Champagne, G.A., (1991). P&W propulsion systems studies results/status. National Aeronautics and Space Administration First Annual High Speed Research Workshop. May 14-16, 1991. pp. 921-948.
Suchezky, M., and Cruzen, G.S. (2012). Variable-speed power-turbine for the large civil tilt rotor. Prepared for NASA. NASA/CR-2012-217424. Feb. 2012. pp. 1-89.
Welch, G.E. (2010). Assessment of aerodynamic challenges of a variable-speed power turbine for large civil tilt-rotor application. Prepared for 66th Annual Forum and Technology Display. May 11-13, 2010. NASA/TM-2010-216758.
Welch, G.E., McVetta, A.B., Stevens, M.A., Howard, S.A., Giel, P.W., Ameri, A.A., To, W., et al. (2012). Variable-speed power-turbine research at Glenn Research Center. Prepared for the 68th Annual Forum and Technology Display. May 1-3, 2012. NASA/TM-2012-217605.
Decision on Appeal. United States U.S. Appl. No. 13/446,194. Appeal 2014-002599. Mailed Mar. 30, 2016.
Decision on Appeal. United States U.S. Appl. No. 13/446,510. Appeal 2014-001580. Mailed Feb. 26, 2016.
Decision on Appeal. United States U.S. Appl. No. 13/558,605. Appeal 2014-004476. Mailed Mar. 30, 2016.
Product Brochure. The ALF 502R turbofan: technology, ecology, economy. Avco Lycoming Textron.
Letter from the Opponent for European Patent Application No. 2811120 (14155460.0) mailed Feb. 15, 2019 by Safran Aircraft Engines.
Request for Opinion as to Validity of European Patent No. 2809922B1 (13778330.4) Observations-in-Reply mailed Apr. 3, 2019 by Rolls-Royce.
Opinion under Section 74(a) for European Patent Application No. 2809922 mailed May 9, 2019.
Boards of Appeal of the European Patent Office for European Patent Application No. 01992470.3. Sep. 27, 2016.
Walsh, P.P. and Fletcher, P. (2004). Gas turbine performance, 2nd Edition. Oxford, UK: Blackwell Science. pp. 1-658.

(56) References Cited

OTHER PUBLICATIONS

Pratt and Whitney PW1100G geared turbofan engine. The Flying Engineer. Retrieved Nov. 4, 2017 from: http://theflyingengineer.com/flightdeck/pw1100g-gtf/.
Halle, J.E. and Michael, C.J. (1984). Energy efficient engine fan component detailed design report. NASA-CR-165466. pp. 1-135.
ASME International Gas Turbine Institute. (Apr. 2013). Trends in the global energy supply and implications for the turbomachinery industry. Global Gas Turbine News, vol. 53(2). pp. 49, 53.
Fitzpatrick, G.A., Broughton, T. (1987). The Rolls-Royce wide chord fan blade. Rolls-Royce Reporting. Mar. 19, 1987. pp. 1-19.
Fitzpatrick, G.A. and Broughton, T. (1988). Diffusion bonding aeroengine components. Def Scie J vol. 38(4). Oct. 1998. pp. 477-485.
Product Brochure. TFE731 Engines: A new generation meeting your highest expectations for reliability, cost of ownership and performance. Allied Signal Aerospace. Copyright 1996. pp. 1-10.
Engine Alliance GP7200. Jane's Aero-Engines. Jane's by IHS Markit. Jul. 12, 2010.
General Electric GE90. Jane's Aero-Engines. Jane's by IHS Markit. Nov. 1, 2010.
Pratt & Whitney PW2000. Jane's Aero-Engines. Jane's by IHS Markit. Sep. 29, 2010.
Treager, I.E. (1995). Aircraft gas turbine engine technology, 3rd Edition. GLENCOE Aviation Technology Series. McGraw-Hill.
Pratt & Whitney PW6000. Jane's Aero-Engines. Jane's by IHS Markit. Nov. 22, 2010.
United Technologies Pratt & Whitney. Jane's Aero-Engines. Jane's by IHS Markit. Aug. 30, 2000.
General Electric CF34. Jane's Aero-Engines. Jane's by IHS Markit. Jul. 26, 2010.
CFM International CFM56. Jane's Aero-Engines. Jane's by IHS Markit. Jan. 31, 2011.
U.S. Department of Transportation: Federal Aviation Administration Type Certificate Data Sheet No. E00064EN. Dated: Nov. 24, 2006. p. 1-5.
Third Party Observations for European Patent No. 2841718 (13822569.3) dated Dec. 13, 2018.
Third Party Observations for European Patent No. 2809953 (13743282.9) dated Sep. 20, 2018.
Third Party Observations for European Patent No. 2809953 (13743282.9) dated Dec. 13, 2018.
Third Party Observations for European Patent No. 2809934 (13775036.0) dated Oct. 11, 2018.
Third Party Observations for European Patent No. 2809934 (13775036.0) dated Dec. 13, 2018.
Third Party Observations for European Patent No. 2920445 (13854452.3) dated Dec. 13, 2018.
Notice of Opposition for European Patent No. 2809939 mailed Sep. 24, 2018 by Safran Aircraft Engines.
Notice of Opposition for European Patent No. 2809939 mailed Sep. 26, 2018 by Rolls-Royce.
Notice of Opposition for European Patent No. 2949882 mailed May 22, 2018 by Rolls-Royce.
Declaration of Dr. Magdy Attia. In re U.S. Pat. No. 9,695,751. Executed Jul. 12, 2018. pp. 1-135.
Principal Brief. *Raytheon Technologies Corporation* v. *General Electric Company*. Inter Partes Review No. IPR2018-01442. Filed Aug. 7, 2020.
Brief for Appellee. *Raytheon Technologies Corporation* v. *General Electric Company*. Inter Partes Review No. IPR2018-01442. Filed Sep. 23, 2020.
Appellant's Reply Brief. *Raytheon Technologies Corporation* v. *General Electric Company*. Inter Partes Review No. IPR2018-01442. Filed Oct. 26, 2020.
Decision Revoking the European Patent 2811120 mailed Jan. 15, 2020.
Response to the Observations Filed by Patent Holder for European Patent No. EP2809922 dated Apr. 29, 2020.
Summons to attend oral proceedings for European Patent Application No. 13777804.9 mail Jul. 7, 2020.
Third Party Observations of European Patent Application No. 2809940 mailed Mar. 30, 2020 by Rolls Royce.
Gray, D.E. and Gardner, W.B. (1983). Energy efficient engine program technology benefit/cost study—vol. 2. NASA CR-174766. Oct. 1983. pp. 1-118.
NASA Contractor Report. Energy efficient engine component development and integration program. NASA-CR-172846. Apr. 30, 1982. pp. 1-151.
Declaration of Dr. Zoltan S. Spakovszky dated Mar. 11, 2020.
Declaration of Dr. Zoltan S. Spakovszky dated Mar. 11, 2020. Appendix A and Appendix B.
Declaration of Dr. Zoltan S. Spakovszky dated Aug. 18, 2020. Exhibit 1, Appendix A and Appendix B.
Letter from the Opponent (Safran) for European Patent 2949881 (15175203.74) dated Mar. 25, 2021.
*Raytheon Techs. Corp.* V. *General Electric Co.*, 993 F.3d 1374 (Fed. Cir. 2021).
Summons to Attend Oral Proceedings for European Application No. 13743282.9 dated Mar. 3, 2021.
Summons to Attend Oral Proceedings for European Patent Application No. 14155460.0 (2811120) mailed Oct. 15, 2021.
Decision Revoking European Patent EP2809939 (13786893.1) by the Opposition Division mailed Aug. 5, 2021.
Attestation by Didier Escure signed Oct. 20, 2020 as filed in the Opposition of European Patent Application No. 13786893.1 (2809939) by Safran Aircraft Engines dated May 4, 2022.
Reply to Appeal in the opposition of European Patent Application No. 13786893.1 (2809939) by Rolls-Royce plc dated Apr. 21, 2022.
Reply to Appeal in the opposition of European Patent Application No. 13786893.1 (2809939) by Safran dated May 4, 2022.

\* cited by examiner

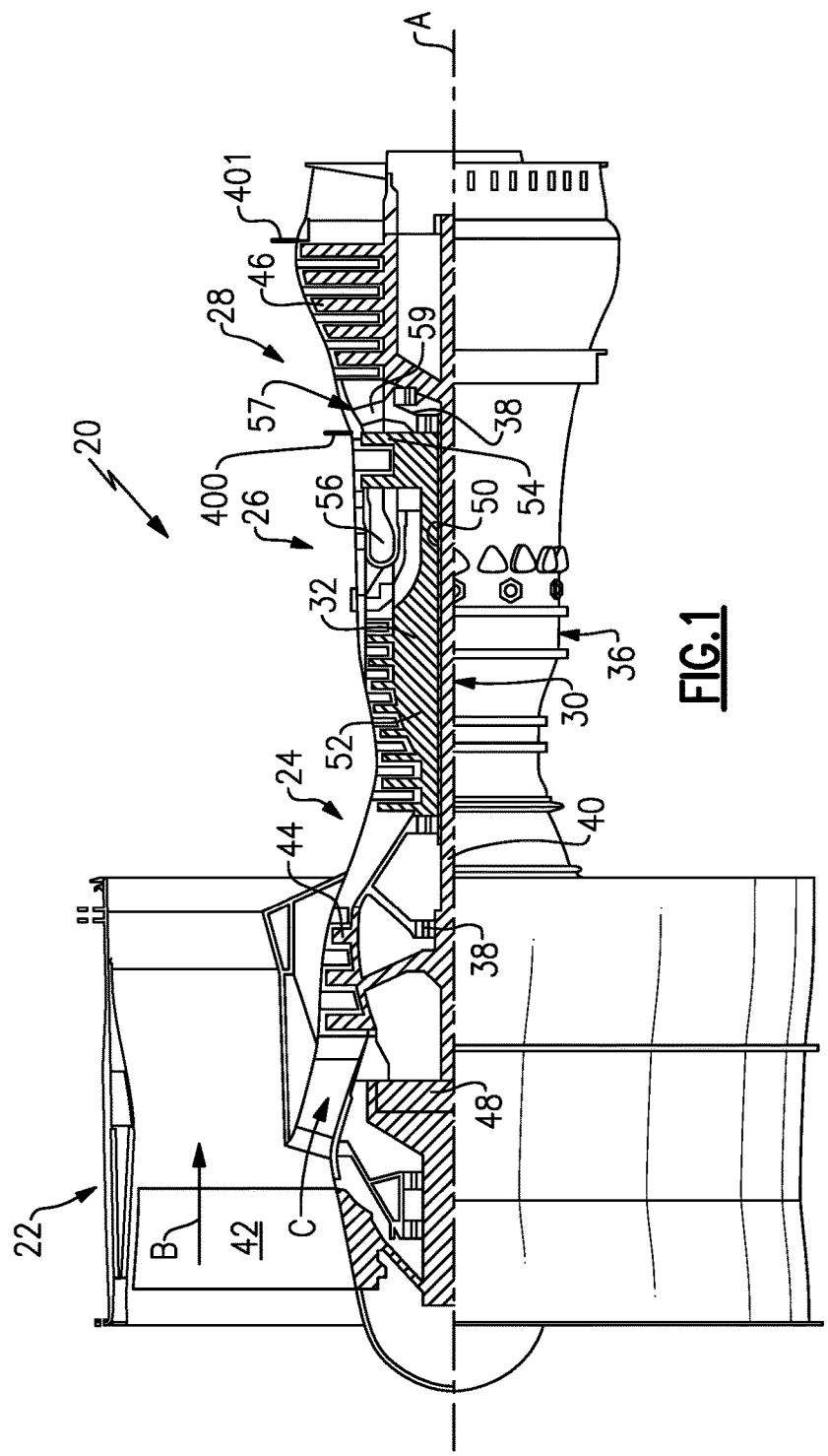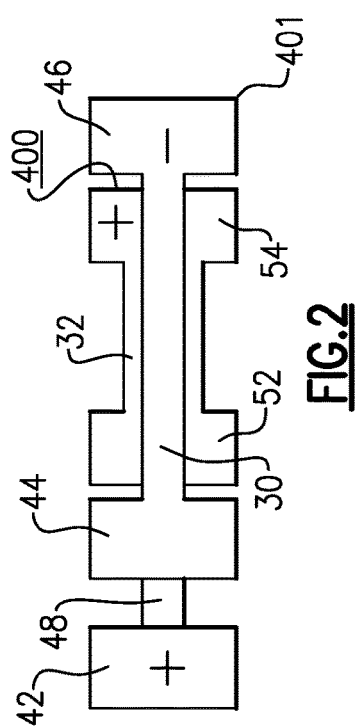

GAS TURBINE ENGINE WITH HIGH SPEED LOW PRESSURE TURBINE SECTION AND BEARING SUPPORT FEATURES

CROSS-REFERENCE TO RELATED APPLICATION

This application is a continuation of U.S. patent application Ser. No. 15/478,706 filed Apr. 4, 2017, which is a continuation-in-part of U.S. patent application Ser. No. 13/446,510 filed Apr. 13, 2012, which claims priority to U.S. Provisional Application No. 61/619,124, filed Apr. 2, 2012, and is a continuation-in-part of U.S. patent application Ser. No. 13/363,154, filed on Jan. 31, 2012 and entitled "Gas Turbine Engine With High Speed Low Pressure Turbine Section."

BACKGROUND OF THE INVENTION

This application relates to a gas turbine engine wherein the low pressure turbine section is rotating at a higher speed and centrifugal pull stress relative to the high pressure turbine section speed and centrifugal pull stress than prior art engines.

Gas turbine engines are known, and typically include a fan delivering air into a low pressure compressor section. The air is compressed in the low pressure compressor section, and passed into a high pressure compressor section. From the high pressure compressor section the air is introduced into a combustion section where it is mixed with fuel and ignited. Products of this combustion pass downstream over a high pressure turbine section, and then a low pressure turbine section.

Traditionally, on many prior art engines the low pressure turbine section has driven both the low pressure compressor section and a fan directly. As fuel consumption improves with larger fan diameters relative to core diameters it has been the trend in the industry to increase fan diameters. However, as the fan diameter is increased, high fan blade tip speeds may result in a decrease in efficiency due to compressibility effects. Accordingly, the fan speed, and thus the speed of the low pressure compressor section and low pressure turbine section (both of which historically have been coupled to the fan via the low pressure spool), have been a design constraint. More recently, gear reductions have been proposed between the low pressure spool (low pressure compressor section and low pressure turbine section) and the fan.

SUMMARY

A gas turbine engine according to an example of the present disclosure includes a turbine section that has a fan drive turbine and a second turbine, and a gear system with a gear reduction. The fan drive turbine drives a fan through the gear system, and a gear ratio of the gear reduction being greater than 2. A mid-turbine frame is positioned intermediate the fan drive turbine and the second turbine. The fan drive turbine has a first exit area at a first exit point and is rotatable at a first speed. The second turbine has a second exit area at a second exit point and is rotatable at a second speed, and the second speed is faster than the first speed. A first performance quantity is defined as the product of the first speed squared and the first area, a second performance quantity is defined as the product of the second speed squared and the second area, and a performance ratio of the first performance quantity to the second performance quantity is between 0.8 and 1.5.

In a further embodiment of any of the foregoing embodiments, the fan drive turbine is a 3-stage to 6-stage turbine, and the second turbine is a 2-stage turbine.

In a further embodiment of any of the foregoing embodiments, the fan drive turbine includes an inlet, an outlet, and a fan drive turbine pressure ratio greater than 5. The fan drive turbine pressure ratio is a ratio of a pressure measured prior to the inlet as related to a pressure at the outlet prior to any exhaust nozzle.

In a further embodiment of any of the foregoing embodiments, a bypass ratio is greater than 10. The fan includes a plurality of fan blades, a fan pressure ratio across the fan blades being less than 1.45, measured across the fan blades alone.

A further embodiment of any of the foregoing embodiments include a compressor section including a low pressure compressor having 3 stages.

In a further embodiment of any of the foregoing embodiments, the mid-turbine frame includes a guide vane positioned intermediate the fan drive turbine and the second turbine.

In a further embodiment of any of the foregoing embodiments, the first speed is greater than 10,000 RPM.

In a further embodiment of any of the foregoing embodiments, the second speed is greater than 20,000 RPM.

In a further embodiment of any of the foregoing embodiments, the fan has fewer than 26 fan blades, and the performance ratio is greater than or equal to 1.0.

A further embodiment of any of the foregoing embodiments includes a compressor section including a low pressure compressor, the fan and the low pressure compressor being rotatable at a common speed.

In a further embodiment of any of the foregoing embodiments, the fan drive turbine and the second turbine are rotatable in opposed directions. The mid-turbine frame includes a guide vane positioned intermediate the fan drive turbine and the second turbine, and the guide vane is an air turning guide vane.

In a further embodiment of any of the foregoing embodiments, the mid-turbine frame has a first bearing supporting a first shaft rotatable with the fan drive turbine in an overhung manner.

In a further embodiment of any of the foregoing embodiments, the mid-turbine frame includes a plurality of airfoils in a core airflow path.

In a further embodiment of any of the foregoing embodiments, the second speed is greater than twice the first speed.

In a further embodiment of any of the foregoing embodiments, the fan blades have a fan tip speed of less than 1150 ft/second, and the gear system is a planetary gear system.

A further embodiment of any of the foregoing embodiments includes a compressor section including a low compressor having 3 stages.

A further embodiment of any of the foregoing embodiments includes a fan drive shaft interconnecting the gear system and the fan. A frame supports at least a portion of the fan drive shaft. The frame defines a frame transverse stiffness. A flexible support at least partially supports the gear system. The flexible support defines a support transverse stiffness with respect to the frame transverse stiffness, and the support transverse stiffness is less than about 50% of the frame transverse stiffness.

A further embodiment of any of the foregoing embodiments includes a compressor section including a first compressor, and the gear reduction is positioned between the fan drive turbine and the first compressor such that the fan and the first compressor are rotatable at a common speed.

A further embodiment of any of the foregoing embodiments includes a fan drive shaft interconnecting the gear system and the fan. A frame supports at least a portion of the fan drive shaft. The frame defines a frame transverse stiffness. A flexible support at least partially supporting the gear system. The flexible support defines a support transverse stiffness with respect to the frame transverse stiffness, and the support transverse stiffness is less than about 50% of the frame transverse stiffness.

In a further embodiment of any of the foregoing embodiments, the mid-turbine frame includes a guide vane positioned intermediate the fan drive turbine and the second turbine.

In a further embodiment of any of the foregoing embodiments, the fan drive turbine and second turbine are rotatable in opposed directions, and the guide vane is an air turning guide vane.

In a further embodiment of any of the foregoing embodiments, the mid-turbine frame has a first bearing supports a first shaft rotatable with the fan drive turbine in an overhung manner.

In a further embodiment of any of the foregoing embodiments, the mid-turbine frame includes a plurality of airfoils in a core airflow path.

In a further embodiment of any of the foregoing embodiments, the performance ratio is greater than or equal to 1.0.

In a further embodiment of any of the foregoing embodiments, the second speed is greater than 20,000 RPM, and wherein the second speed is greater than twice the first speed.

In a further embodiment of any of the foregoing embodiments, the performance ratio is greater than or equal to 1.0, the second speed is greater than twice the first speed, the fan has fewer than 26 fan blades, the fan blades have a fan tip speed of less than 1150 ft/second, and the gear system is a planetary gear system.

In a further embodiment of any of the foregoing embodiments, the turbine section drives a compressor section that has a first compressor. The gear system is straddle-mounted by bearings, and the gear system is intermediate the fan drive turbine and the first compressor such that the fan and the first compressor are rotatable at a common speed.

A further embodiment of any of the foregoing embodiments include a fan drive shaft interconnecting the gear system and the fan. A frame supports at least a portion of the fan drive shaft. The frame defines a frame transverse stiffness and a frame lateral stiffness. A flexible support at least partially supports the gear system. The flexible support defines a support transverse stiffness with respect to the frame transverse stiffness and a support lateral stiffness with respect to the frame lateral stiffness. The support transverse stiffness is less than about 80% of the frame transverse stiffness. The support lateral stiffness is less than about 80% of the frame lateral stiffness.

In a further embodiment of any of the foregoing embodiments, the support transverse stiffness is less than about 50% of the frame transverse stiffness, and the support lateral stiffness is less than about 50% of the frame lateral stiffness.

In a further embodiment of any of the foregoing embodiments, the gear system is straddle-mounted by bearings.

In a featured embodiment, a turbine section of a gas turbine engine has a fan drive and second turbine sections. The fan drive turbine section has a first exit area at a first exit point and is configured to rotate at a first speed. The second turbine section has a second exit area at a second exit point and rotates at a second speed, which is faster than the first speed. A first performance quantity is defined as the product of the first speed squared and the first area. A second performance quantity is defined as the product of the second speed squared and the second area. A ratio of the first performance quantity to the second performance quantity is between about 0.5 and about 1.5. A mid-turbine frame is positioned intermediate the fan drive and second turbine sections, and has a first bearing supporting an outer periphery of a first shaft rotating with the second turbine section.

In another embodiment according to the previous embodiment, the mid-turbine frame also includes a second bearing supporting an outer periphery of a second shaft rotating with the fan drive turbine section. The second bearing supports an intermediate portion of the second spool.

In another embodiment according to any of the previous embodiments, the ratio is above or equal to about 0.8.

In another embodiment according to any of the previous embodiments, the fan drive turbine section has at least 3 stages.

In another embodiment according to any of the previous embodiments, the fan drive turbine section has up to 6 stages.

In another embodiment according to any of the previous embodiments, the second turbine section has 2 or fewer stages.

In another embodiment according to any of the previous embodiments, a pressure ratio across the fan drive turbine section is greater than about 5:1.

In another embodiment according to any of the previous embodiments, the mid-turbine frame is provided with a guide vane positioned intermediate the fan drive and second turbine sections.

In another embodiment according to any of the previous embodiments, the fan drive and second turbine sections will rotate in opposed directions. The guide vane is a turning guide vane.

In another featured embodiment, a gas turbine engine has a fan, a compressor section in fluid communication with the fan, a combustion section in fluid communication with the compressor section, and a turbine section in fluid communication with the combustion section. The turbine section includes a fan drive turbine section and a second turbine section. The fan drive turbine section has a first exit area at a first exit point and is configured to rotate at a first speed. The second turbine section has a second exit area at a second exit point and rotates at a second speed, which is higher than the first speed. A first performance quantity is defined as the product of the first speed squared and the first area. A second performance quantity is defined as the product of the second speed squared and the second area. A ratio of the first performance quantity to the second performance quantity is between about 0.5 and about 1.5. The second turbine section is supported by a first bearing in a mid-turbine frame.

In another embodiment according to the previous embodiment, the ratio is above or equal to about 0.8.

In another embodiment according to any of the previous embodiments, the compressor section includes first and second compressor sections. The fan drive turbine section and the first compressor section will rotate in a first direction. The second turbine section and the second compressor section will rotate in a second opposed direction.

In another embodiment according to any of the previous embodiments, a gear reduction is included between the fan and a shaft driven by the fan drive turbine section such that the fan will rotate at a lower speed than the fan drive turbine section.

In another embodiment according to any of the previous embodiments, the second turbine section and second compressor section are straddle-mounted by bearings supported on an outer periphery of a shaft rotating with the second compressor section and the second turbine section.

In another embodiment according to any of the previous embodiments, the mid-turbine frame further includes a second bearing supporting an outer periphery of a shaft rotating with the fan drive turbine section.

In another embodiment according to any of the previous embodiments, the second bearing supports an intermediate portion of a shaft that will rotate with the fan drive turbine section and the first compressor section.

In another featured embodiment, a gas turbine engine has a fan, a compressor section in fluid communication with the fan, a combustion section in fluid communication with the compressor section, and a turbine section in fluid communication with the combustion section. The turbine section includes fan drive and second turbine sections. The fan drive turbine section has a first exit area at a first exit point and is configured to rotate at a first speed. The second turbine section has a second exit area at a second exit point and rotates at a second speed, which is higher than the first speed. A first performance quantity is defined as the product of the first speed squared and the first area. A second performance quantity is defined as the product of the second speed squared and the second area. A ratio of the first performance quantity to the second performance quantity is between about 0.5 and about 1.5. The compressor section includes first and second compressor sections, where the fan drive turbine section and the first compressor section will rotate in a first direction and the second turbine section and the second compressor section will rotate in a second opposed direction. A gear reduction is included between the fan and the first compressor section, such that the fan will rotate at a lower speed than the fan drive turbine section, and in the second opposed direction. A gear ratio of the gear reduction is greater than about 2.3.

In another embodiment according to the previous embodiment, the ratio is above or equal to about 0.8.

In another embodiment according to any of the previous embodiments, a mid-turbine frame is positioned intermediate the fan drive and second turbine sections. The mid-turbine frame has a first bearing supporting an outer periphery of a first shaft rotating with the second turbine section.

In another embodiment according to any of the previous embodiments, the first shaft is supported on a second bearing on its outer periphery, with the second bearing mounted to static structure.

These and other features of this disclosure will be better understood upon reading the following specification and drawings, the following of which is a brief description.

BRIEF DESCRIPTION OF THE DRAWINGS

FIG. 1 shows a gas turbine engine.
FIG. 2 schematically shows the arrangement of the low and high spool, along with the fan drive.

DETAILED DESCRIPTION

Figure 3:
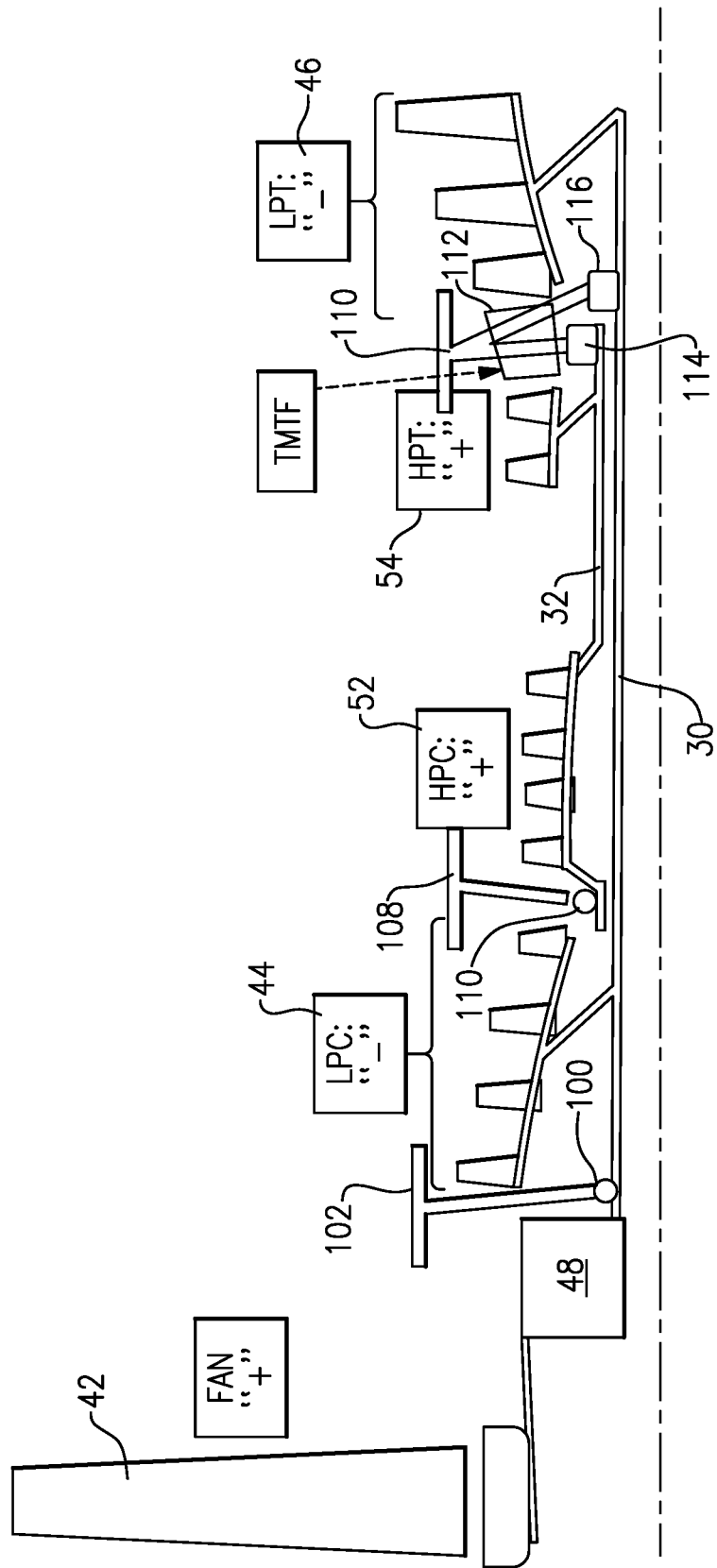
FIG. 3 shows a schematic view of a mount arrangement for an engine such as shown in FIGS. 1 and 2.

FIG. 1 schematically illustrates a gas turbine engine 20. The gas turbine engine 20 is disclosed herein as a two-turbine turbofan that generally incorporates a fan section 22, a compressor section 24, a combustor section 26 and a turbine section 28. Alternative engines might include an augmentor section (not shown) among other systems or features. The fan section 22 drives air along a bypass flow path B while the compressor section 24 drives air along a core flow path C for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines including three-turbine architectures.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an innermost shaft 40 that interconnects a fan 42, a low pressure (or first) compressor section 44 and a low pressure (or first) turbine section 46. Note, turbine section 46 will also be called a fan drive turbine section. The inner shaft 40 is connected to the fan 42 through a geared architecture 48 to drive the fan 42 at a lower speed than the fan drive turbine 46. The high speed spool 32 includes a more outer shaft 50 that interconnects a high pressure (or second) compressor section 52 and high pressure (or second) turbine section 54. A combustor 56 is arranged between the high pressure compressor section 52 and the high pressure turbine section 54. A mid-turbine frame 57 of the engine static structure 36 is arranged generally between the high pressure turbine section 54 and the low pressure turbine section 46. The mid-turbine frame 57 further supports bearing systems 38 in the turbine section 28. As used herein, the high pressure turbine section experiences higher pressures than the low pressure turbine section. A low pressure turbine section is a section that powers a fan 42. The inner shaft 40 and the outer shaft 50 are concentric and rotate via bearing systems 38 about the engine central longitudinal axis A which is collinear with their longitudinal axes. The high and low spools can be either co-rotating or counter-rotating.

The core airflow C is compressed by the low pressure compressor section 44 then the high pressure compressor section 52, mixed and burned with fuel in the combustor 56, then expanded over the high pressure turbine section 54 and low pressure turbine section 46. The mid-turbine frame 57 includes airfoils 59 (one shown in FIG. 1) which are in the core airflow path. The turbine sections 46, 54 rotationally drive the respective low speed spool 30 and high speed spool 32 in response to the expansion.

The engine 20 in one example is a high-bypass geared aircraft engine. The bypass ratio is the amount of air delivered into bypass path B divided by the amount of air into core path C. In a further example, the engine 20 bypass ratio is greater than about six (6), with an example embodiment being greater than ten (10), the geared architecture 48 is an epicyclic gear train, such as a planetary gear system or other gear system, with a gear reduction ratio of greater than about 2.3 and the low pressure turbine section 46 has a pressure ratio that is greater than about 5. In some embodiments, the bypass ratio is less than or equal to about 22.0, and the gear reduction is less than or equal to about 4.5. In one disclosed embodiment, the engine 20 bypass ratio is greater than about ten (10:1), the fan diameter is significantly larger than that of the low pressure compressor section 44, and the low pressure turbine section 46 has a pressure ratio that is greater than about 5:1. In some embodiments, the low pressure turbine section 46 has a pressure ratio that is less than or equal to about 30. In some embodiments, the high pressure turbine section may have two or fewer stages. In contrast, the low pressure turbine section 46, in some embodiments, has between 3 and 6 stages. Further the low pressure turbine section 46 pressure ratio is total pressure measured prior to inlet of low pressure turbine section 46 as related to the total pressure at the outlet of the low pressure turbine section 46 prior to an exhaust nozzle. The geared architecture 48 may be an epicycle gear train, such as a planetary gear system or other gear system, with a gear reduction ratio of greater than about 2.5:1. It should be understood, however, that the above parameters are only exemplary of one embodiment of a geared architecture engine.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ("TSFC")." TSFC is the industry standard parameter of the rate of lbm of fuel being burned per hour divided by lbf of thrust the engine produces at that flight condition. "Low fan pressure ratio" is the ratio of total pressure across the fan blade alone, before the fan exit guide vanes. The low fan pressure ratio as disclosed herein according to one non-limiting embodiment is less than about 1.45, and is greater than or equal to about 1.1. "Low corrected fan tip speed" is the actual fan tip speed in ft/sec divided by an industry standard temperature correction of [(Ram Air Temperature deg R)/518.7)^0.5]. The "Low corrected fan tip speed" as disclosed herein according to one non-limiting embodiment is less than about 1150 ft/second, and is greater than or equal to about 850 ft/second. Further, the fan 42 may have 26 or fewer blades.

An exit area 400 is shown, in FIG. 1 and FIG. 2, at the exit location for the high pressure turbine section 54 is the annular area of the last blade of turbine section 54. An exit area for the low pressure turbine section is defined at exit 401 for the low pressure turbine section and is the annular area defined by the blade of that turbine section 46. As shown in FIG. 2, the turbine engine 20 may be counter-rotating. This means that the low pressure turbine section 46 and low pressure compressor section 44 rotate in one direction ("−"), while the high pressure spool 32, including high pressure turbine section 54 and high pressure compressor section 52 rotate in an opposed ("+") direction. The gear reduction 48, which may be, for example, an epicyclic transmission (e.g., with a sun, ring, and planet gears), is selected such that the fan 42 rotates in the same direction ("+") as the high spool 32. With this arrangement, and with the other structure as set forth above, including the various quantities and operational ranges, a very high speed can be provided to the low pressure spool. Low pressure turbine section and high pressure turbine section operation are often evaluated looking at a performance quantity which is the exit area for the turbine section multiplied by its respective speed squared. This performance quantity ("PQ") is defined as:

$$PQ_{ltp} = (A_{lpt} \times V_{lpt}^2)$$ Equation 1:

$$PQ_{hpt} = (A_{hpt} \times V_{hpt}^2)$$ Equation 2:

where $A_{lpt}$ is the area of the low pressure turbine section at the exit thereof (e.g., at 401), where $V_{lpt}$ is the speed of the low pressure turbine section, where $A_{hpt}$ is the area of the high pressure turbine section at the exit thereof (e.g., at 400), and where $V_{hpt}$ is the speed of the low pressure turbine section.

Thus, a ratio of the performance quantity for the low pressure turbine section compared to the performance quantify for the high pressure turbine section is:

$$(A_{lpt} \times V_{lpt}^2)/(A_{hpt} \times V_{hpt}^2) = PQ_{ltp}/PQ_{hpt}$$ Equation 3:

In one turbine embodiment made according to the above design, the areas of the low and high pressure turbine sections are 557.9 in² and 90.67 in², respectively. Further, the speeds of the low and high pressure turbine sections are 10179 rpm and 24346 rpm, respectively, such that the speed of the high pressure turbine section is more than twice the speed of the low pressure section, and such that the speeds of the low and high pressure turbine sections being greater than 10000 and 20000 rpm, respective. Thus, using Equations 1 and 2 above, the performance quantities for the low and high pressure turbine sections are:

$$PQ_{ltp} = (A_{lpt} \times V_{lpt}^2) = (557.9 \text{ in}^2)(10179 \text{ rpm})^2 = 57805157673.9 \text{ in}^2\text{rpm}^2$$ Equation 1:

$$PQ_{hpt} = (A_{hpt} \times V_{hpt}^2) = (90.67 \text{ in}^2(24346 \text{ rpm})^2 = 53742622009.72 \text{ in}^2\text{rpm}^2$$ Equation 2:

and using Equation 3 above, the ratio for the low pressure turbine section to the high pressure turbine section is:

$$\text{Ratio} = PQ_{ltp}/PQ_{hpt} = 57805157673.9 \text{ in}^2\text{rpm}^2/53742622009.72 \text{ in}^2\text{rpm}^2 = 1.075$$

In another embodiment, the ratio was about 0.5 and in another embodiment the ratio was about 1.5. With $PQ_{ltp}/PQ_{hpt}$ ratios in the 0.5 to 1.5 range, a very efficient overall gas turbine engine is achieved. More narrowly, $PQ_{ltp}/PQ_{htp}$ ratios of above or equal to about 0.8 are more efficient. Even more narrowly, $PQ_{ltp}/PQ_{hpt}$ ratios above or equal to 1.0 are even more efficient. As a result of these $PQ_{ltp}/PQ_{hpt}$ ratios, in particular, the turbine section can be made much smaller than in the prior art, both in diameter and axial length. In addition, the efficiency of the overall engine is greatly increased.

The low pressure compressor section is also improved with this arrangement, and behaves more like a high pressure compressor section than a traditional low pressure compressor section. It is more efficient than the prior art, and can provide more compression in fewer stages. The low pressure compressor section may be made smaller in radius and shorter in length while contributing more toward achieving the overall pressure ratio design target of the engine.

As shown in FIG. 3, the engine as shown in FIGS. 1 and 2 may be mounted such that the high pressure turbine 54 is supported on a rear end by a mid-turbine frame 110. The mid-turbine frame 110 may be provided with a guide vane 112 that is an air turning vane. Since the high pressure turbine 54 and the low pressure or fan drive turbine 46 rotate in opposed directions, the use of the turning vane intermediate the two will ensure that the gases leaving the high pressure turbine 54 approach the low pressure turbine 46 traveling in the proper direction. As is clear from FIG. 3, the mid-turbine frame 110 also includes a bearing 116 which supports a shaft that rotates with the low spool 30 in an "overhung" manner. That is, the bearing 116 is at an intermediate position on the shaft, rather than adjacent the end.

Static structure 102 and 108 support other bearings 100 and 110 to support the shafts driven by spools 30 and 32 on the compressor end. The high pressure turbine 54 can be said to be "straddle-mounted" due to the bearings 110 and 114 on the outer periphery of the shaft 32.

Figure 4:
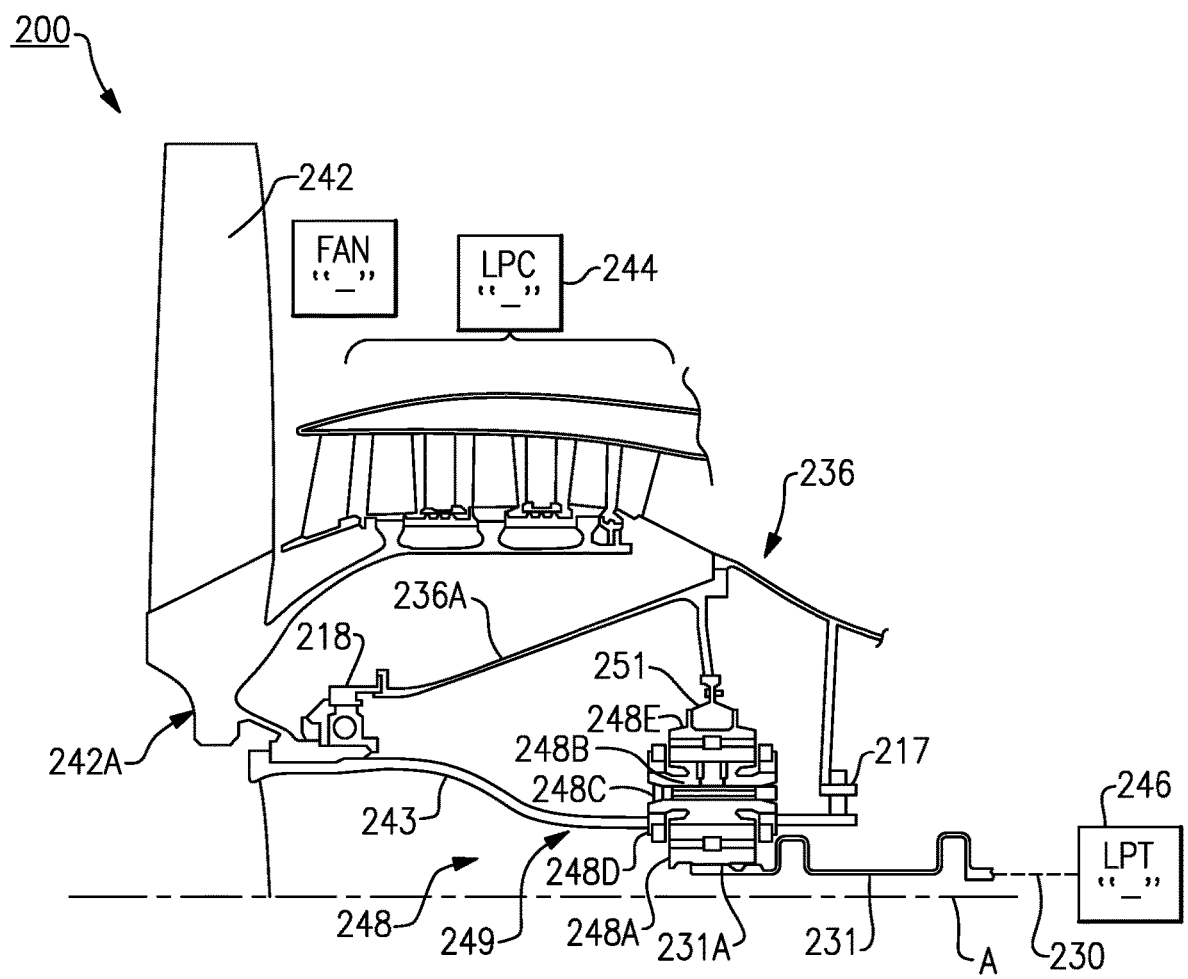
FIG. 4 shows another embodiment of a gas turbine engine.

FIG. 4 shows an embodiment 200, having a gear reduction 248 intermediate a low pressure (or first) compressor section 244 and a shaft 230 driven by a low pressure turbine section 246. Embodiment 200 can be utilized and/or combined with the features of the engine 20 as shown in FIGS. 1 to 3, for example, with like reference numerals designating like elements where appropriate and reference numerals with the addition of one-hundred or multiples thereof designating modified elements that are understood to incorporate the same features and benefits of the corresponding original elements.

The gear reduction 248 includes a sun gear 248A attached to the shaft 230. The sun gear 248A can be mounted to a flexible input 231 which is attached to the shaft 230. The gear reduction 248 can include a spline interface 231A, in which flexible input 231 has a spline which mates with and engages an inner periphery of the sun gear 248A. Accordingly, the sun gear 248A can be driven by the spline interface 231A of the flexible input 231. Surrounding the sun gear 248A is a plurality of planet gears 248B supported on bearings 248C attached to a carrier 248D mounted to a fan drive shaft 243. The planet gears 248B are surrounded on a radially outward side by a ring gear 248E. The fan drive shaft 243 interconnects an output 249 of the gear reduction 248 and the fan 242, with the fan 242 and the low pressure compressor section 244 being driven by the output 249 of the gear reduction 248. In the illustrated embodiment of FIG. 4, the output 249 is the carrier 248D of the gear reduction 248, with the carrier 248D being rotatable about the engine axis A and the ring gear 248E being fixed. The low pressure compressor 244 can be driven by the shaft 230 such that the low pressure compressor 244 and the low pressure turbine 246 are rotatable at a common speed and a common direction. In another example, the fan 242 and the low pressure compressor section 244 are coupled to the gear reduction 248 such that the fan 242 and the low pressure compressor section 244 are rotatable at different speeds and/or in different directions.

The ring gear 248E can be attached to the engine static structure 236 through a flexible support 251 which at least partially supports the gear reduction 248. The static structure 236 includes a bearing support or frame 236A which supports at least a portion of the fan drive shaft 243 via a fan shaft roller bearing 217 and a fan shaft thrust bearing 218. The gear reduction 248 connects to the fan drive shaft 243 axially forward of the fan shaft roller bearing 217 and axially rearward of the fan shaft thrust bearing 218 in order to allow the gear reduction 248 to be at least partially axially aligned with the low pressure compressor 244. Alternatively, the fan shaft roller bearings 217 could be located axially forward of the gear reduction 248 and the fan shaft thrust bearing 218 could be located axially aft of the gear reduction 248. The bearings 217 and 218 are positioned on opposite sides of the gear reduction 248 relative to engine axis A and support the gear reduction 248 in a "straddle-mounted" manner. In the illustrated embodiment of FIG. 4, the fan shaft roller bearing 217 supports an aft portion of the carrier 248D.

The frame 236A defines a frame lateral stiffness and a frame transverse stiffness. It should be understood that the term "lateral" as defined herein is generally transverse to the engine axis A, and the term "transverse" refers to a pivotal bending movement with respect to the engine axis A which typically absorbs deflection applied to the gear reduction 248. The flexible input 231 and the flexible support 251 each can be arranged to define a respective support/input lateral stiffness and a support/input transverse stiffness.

In examples, the support transverse stiffness and/or the input transverse stiffness are less than the frame transverse stiffness. In some examples, the support lateral stiffness and/or the input lateral stiffness are less than the frame transverse stiffness. In one example, both the support lateral stiffness and the input lateral stiffness are less than about 80% of the frame lateral stiffness, or more narrowly less than about 50%, with the lateral stiffness of the entire gear reduction 248 being controlled by this lateral stiffness relationship. Alternatively, or in addition to this relationship, both the support transverse stiffness and the input transverse stiffness are each less than about 80% of the frame transverse stiffness, or more narrowly between 80% and 50%, less than about 65%, or less than about 50%, with the transverse stiffness of the entire gear reduction 248 being controlled by this transverse stiffness relationship. In some examples, the support lateral stiffness and/or the input lateral stiffness are less than about 20% of the frame lateral stiffness. In other examples, the support transverse stiffness and/or the input transverse stiffness are less than about 20% of the frame transverse stiffness.

Figure 5:
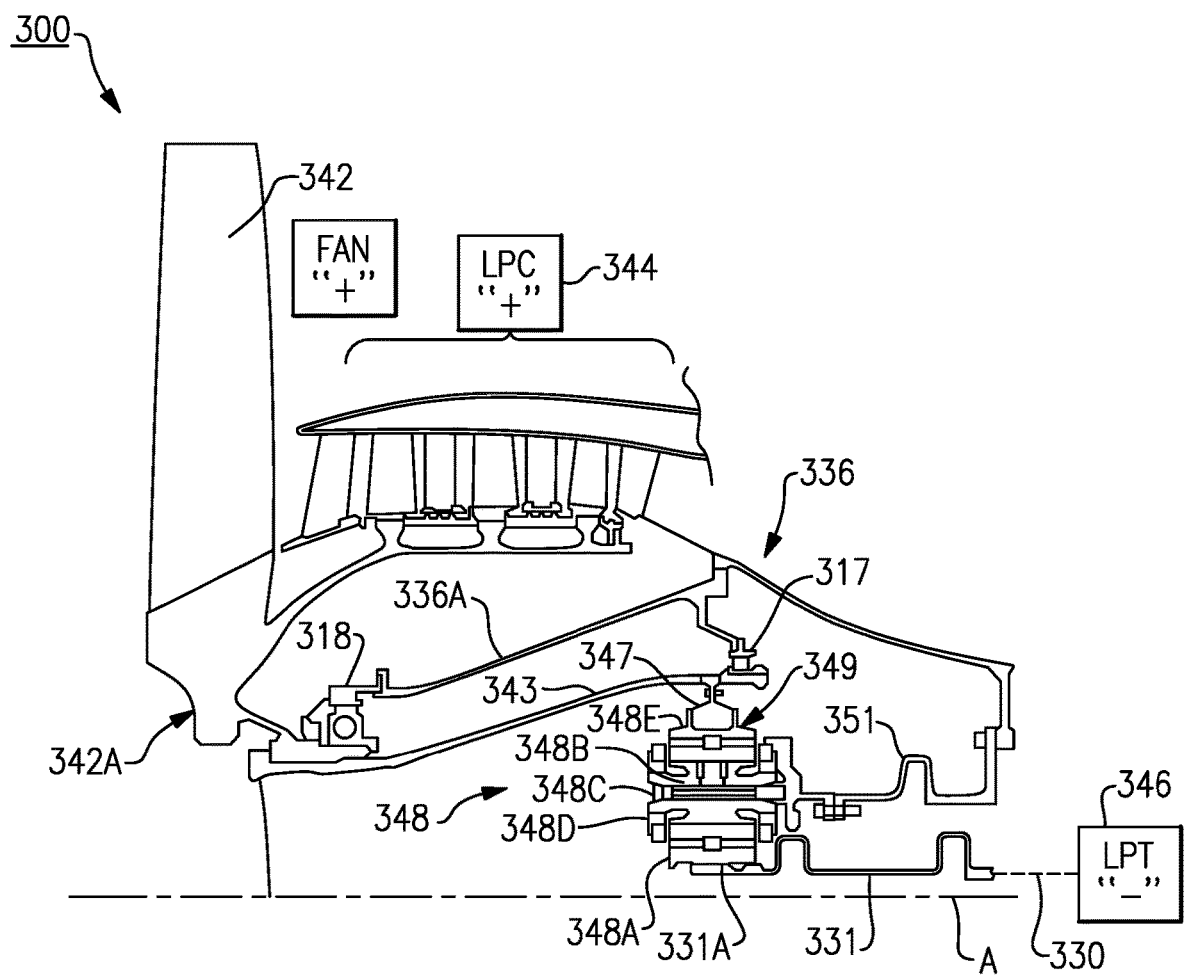
FIG. 5 shows yet another embodiment of a gas turbine engine.

FIG. 5 shows an embodiment 300 with gear reduction 348. In the illustrated example of FIG. 5, the output 349 is the ring gear 348E, with the fan drive shaft 343 mechanically attached to a fan rotor 342A of the fan 342 such that the fan 342 and the low pressure compressor section 344 are rotatable at a common speed and in a common direction. The carrier 348D is attached to the engine static structure 336 through a flexible support 351. The gear reduction 348 includes a flexible output coupling 247 which interconnects output 249 of the gear reduction 348 and the fan drive shaft 343. The flexible input 331, the flexible output coupling 347, and the flexible support 351 work together to maintain alignment of the gear reduction 348 and can facilitate the segregation of vibrations and other transients between the various components during operation of the gas turbine engine 20.

While this invention has been disclosed with reference to one embodiment, it should be understood that certain modifications would come within the scope of this invention. For that reason, the following claims should be studied to determine the true scope and content of this invention.

What is claimed is:

1. A turbofan engine comprising:
   a fan including a plurality of fan blades, and an outer housing surrounding the fan to define a bypass flow path;
   a low fan pressure ratio of less than 1.45 measured across the fan blades alone at a cruise condition at 0.8 Mach and 35,000 feet;
   a compressor section including a low pressure compressor and a high pressure compressor, and the low pressure compressor including 3 stages;
   a turbine section including a fan drive turbine and a second turbine, wherein the fan drive turbine is a 3-stage to 6-stage turbine, and the second turbine is a 2-stage turbine driving the high pressure compressor;

an epicyclic gear system with a gear reduction, the fan drive turbine driving the fan through the gear system, and the gear system straddle-mounted by first and second bearings on opposite sides of the gear reduction relative to an engine longitudinal axis;

a fan drive shaft interconnecting the gear system and the fan;

a frame supporting at least a portion of the fan drive shaft, the frame defining a frame transverse stiffness and a frame lateral stiffness;

a flexible support at least partially supporting the gear system relative to an engine static structure, the flexible support defining a support transverse stiffness with respect to the frame transverse stiffness and a support lateral stiffness with respect to the frame lateral stiffness; and wherein the support transverse stiffness is between 50% and 80% of the frame transverse stiffness, and the support lateral stiffness is at least 20% but less than 80% of the frame lateral stiffness;

wherein the fan drive turbine has a first exit area at a first exit point and is rotatable at a first speed, the second turbine has a second exit area at a second exit point and is rotatable at a second speed, the second speed being greater than twice the first speed;

wherein a first performance quantity is defined as the product of the first speed squared and the first exit area, a second performance quantity is defined as the product of the second speed squared and the second exit area, and a performance ratio of the first performance quantity to the second performance quantity is between 1.0 and 1.075;

wherein the turbofan engine is a two-spool engine including a low spool and a high spool, wherein the low spool includes an inner shaft that interconnects the fan, the low pressure compressor and the fan drive turbine, wherein the high spool includes an outer shaft that interconnects the high pressure compressor and the second turbine, and wherein the inner shaft and the outer shaft are concentric and are rotatable about the engine longitudinal axis;

wherein the gear system includes a sun gear, a plurality of intermediate gears surrounding the sun gear, and a ring gear surrounding the intermediate gears;

wherein the gear system is a planetary gear system including a carrier that supports the intermediate gears, the first bearing supports the fan drive shaft, the fan drive shaft interconnects the carrier and the fan, and the second bearing supports an aft portion of the carrier; and wherein the second bearing is axially aligned with the carrier relative to the engine longitudinal axis, and the second bearing is situated along an outer periphery of the carrier.

2. The turbofan engine as set forth in claim 1, further comprising a mid-turbine frame positioned intermediate the fan drive turbine and the second turbine, and the mid-turbine frame has a bearing supporting the inner shaft rotatable with the fan drive turbine.

3. The turbofan engine as set forth in claim 2, wherein the fan drive turbine and the second turbine are rotatable in opposed directions, the mid-turbine frame includes a guide vane positioned intermediate the fan drive turbine and the second turbine, and the guide vane being an air turning guide vane.

4. The turbofan engine as set forth in claim 3, wherein the support transverse stiffness is less than 65% of the frame transverse stiffness.

5. The turbofan engine as set forth in claim 4, wherein the support lateral stiffness is less than 50% of the frame lateral stiffness.

6. The turbofan engine as set forth in claim 5, wherein the gear reduction is positioned between the fan drive turbine and the low pressure compressor such that the fan and the low pressure compressor are rotatable at a common speed.

7. The turbofan engine as set forth in claim 6, wherein the bearing of the mid-turbine frame supports the inner shaft in an overhung manner.

8. The turbofan engine as set forth in claim 6, wherein the sun gear is mounted to a flexible input attached to the inner shaft driven by the fan drive turbine.

9. The turbofan engine as set forth in claim 8, wherein the first bearing is a thrust bearing, the second bearing is a roller bearing.

10. The turbofan engine as set forth in claim 1, wherein the gear system includes a carrier that supports the intermediate gears, the carrier is attached to an engine static structure, the first bearing supports the fan drive shaft, and the fan drive shaft interconnects the ring gear and the fan.

11. The turbofan engine as set forth in claim 10, further comprising a mid-turbine frame positioned intermediate the fan drive turbine and the second turbine, and the mid-turbine frame has a bearing supporting the inner shaft rotatable with the fan drive turbine.

12. The turbofan engine as set forth in claim 11, wherein the support lateral stiffness is less than 50% of the frame lateral stiffness.

13. The turbofan engine as set forth in claim 12, wherein the fan drive turbine and second turbine are rotatable in opposed directions.

14. The turbofan engine as set forth in claim 13, wherein the gear reduction is positioned between the fan drive turbine and the low pressure compressor such that the fan and the low pressure compressor are rotatable at a common speed.

15. The turbofan engine as set forth in claim 14, wherein the sun gear is mounted to a flexible input attached to the inner shaft driven by the fan drive turbine, the first bearing is a thrust bearing, the second bearing is a roller bearing.

16. The turbofan engine as set forth in claim 14, wherein the fan drive turbine is a 3-stage turbine, and the low pressure compressor is a three-stage compressor.

17. The turbofan engine as set forth in claim 14, wherein the low pressure compressor has a greater number of stages than the fan drive turbine.

18. The turbofan engine as set forth in claim 11, wherein the fan drive turbine is a 3-stage turbine.

19. The turbofan engine as set forth in claim 18, wherein the low pressure compressor is a three-stage compressor.

20. The turbofan engine as set forth in claim 11, wherein the low pressure compressor has a greater number of stages than the fan drive turbine.

* * * * *